(12) United States Patent
Noboa et al.

(10) Patent No.: US 11,774,274 B2
(45) Date of Patent: Oct. 3, 2023

(54) REDUCED LENGTH VALVE ASSEMBLY WITH ULTRASONIC FLOW SENSOR

(71) Applicant: Johnson Controls Tyco IP Holdings LLP, Milwaukee, WI (US)

(72) Inventors: Homero L. Noboa, Waukesha, WI (US); Camille M. Aucoin, Milwaukee, WI (US); Kirk H. Drees, Cedarburg, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/736,551

(22) Filed: May 4, 2022

(65) Prior Publication Data

US 2022/0260402 A1 Aug. 18, 2022

Related U.S. Application Data

(63) Continuation of application No. 16/709,542, filed on Dec. 10, 2019, now Pat. No. 11,359,950.

(51) Int. Cl.
*G01F 1/667* (2022.01)
*G05D 7/06* (2006.01)
*G05D 23/19* (2006.01)
*G01F 15/00* (2006.01)

(52) U.S. Cl.
CPC ........... *G01F 1/667* (2013.01); *G05D 7/0623* (2013.01); *G05D 7/0635* (2013.01); *G01F 15/005* (2013.01); *G05D 23/1934* (2013.01)

(58) Field of Classification Search
CPC ..... G01F 1/667; G01F 15/005; G05D 7/0623; G05D 7/0635; G05D 23/1934
USPC ................................ 137/10, 487.5, 498, 486
See application file for complete search history.

(56) References Cited

U.S. PATENT DOCUMENTS

| | | |
|---|---|---|
| 4,031,463 A | 6/1977 | Norberg |
| 4,080,574 A | 3/1978 | Loosemore et al. |
| 4,515,021 A | 5/1985 | Wallace et al. |
| 5,118,968 A | 6/1992 | Douglas et al. |
| 5,464,369 A | 11/1995 | Federspiel |
| 5,822,740 A | 10/1998 | Haissig et al. |
| 6,145,751 A | 11/2000 | Ahmed |
| 6,427,461 B1 | 8/2002 | Whinery et al. |

(Continued)

OTHER PUBLICATIONS

Belimo, "Ultrasonic Flow Sensors—Trusted Flow Measurement—NEW 2 1/2" to 6" Flanged Versions," YouTube, URL: https://www.youtube.com/watch?v=GeuKiAnnEFo, May 15, 2019 (36 pages).

(Continued)

*Primary Examiner* — Minh Q Le
(74) *Attorney, Agent, or Firm* — Foley & Lardner LLP

(57) ABSTRACT

A system for controlling a flow rate of a fluid through a valve includes a controller. The controller is configured to receive a raw flow rate measurement from a flow rate sensor assembly configured to measure the flow rate. The controller is further configured to apply a flow rate measurement filter to the raw flow rate measurement to generate a filtered flow rate measurement. The controller is further configured to control actuation of an actuator configured to change the flow rate using the filtered flow rate measurement. The controller is configured to automatically adjust the flow rate measurement filter in response to detecting an event that causes stoppage of the actuation of the actuator.

20 Claims, 17 Drawing Sheets

(56) References Cited

U.S. PATENT DOCUMENTS

| | | |
|---|---|---|
| 6,502,061 B1 | 12/2002 | Segawa |
| 6,634,240 B1 | 10/2003 | Wallen |
| 6,644,049 B2 | 11/2003 | Alford |
| 6,919,809 B2 | 7/2005 | Blunn et al. |
| 7,149,605 B2 | 12/2006 | Chassin et al. |
| 7,243,004 B2 | 7/2007 | Shah et al. |
| 7,590,469 B2 | 9/2009 | Grohman |
| 7,600,694 B2 | 10/2009 | Helt et al. |
| 7,650,206 B2 | 1/2010 | Hudson |
| 7,821,218 B2 | 10/2010 | Butler et al. |
| 7,837,128 B2 | 11/2010 | Helt et al. |
| 7,840,311 B2 | 11/2010 | Grohman |
| 7,844,764 B2 | 11/2010 | Williams |
| 7,894,512 B2 | 2/2011 | Beadle et al. |
| 8,825,185 B2 | 9/2014 | Salsbury |
| 8,841,801 B2 | 9/2014 | Jokinen |
| 9,568,204 B2 | 2/2017 | Asmus et al. |
| 9,903,882 B2 | 2/2018 | Hies et al. |
| 10,551,230 B2 | 2/2020 | Ploss et al. |
| 2004/0024559 A1 | 2/2004 | Down et al. |
| 2004/0190211 A1 | 9/2004 | Ockert et al. |
| 2005/0072248 A1 | 4/2005 | Suginouchi et al. |
| 2006/0165149 A1 | 7/2006 | Kolk |
| 2006/0267756 A1 | 11/2006 | Kates |
| 2008/0190213 A1 | 8/2008 | Lang |
| 2010/0174506 A1 | 7/2010 | Joseph et al. |
| 2010/0250009 A1 | 9/2010 | Lifson et al. |
| 2010/0286799 A1 | 11/2010 | Matsen et al. |
| 2010/0298981 A1 | 11/2010 | Chamorro et al. |
| 2010/0298982 A1 | 11/2010 | Chamorro et al. |
| 2010/0298983 A1 | 11/2010 | Beste et al. |
| 2010/0298984 A1 | 11/2010 | Mauk et al. |
| 2010/0298987 A1 | 11/2010 | Bennett et al. |
| 2010/0298988 A1 | 11/2010 | Stachler et al. |
| 2010/0298989 A1 | 11/2010 | Hess et al. |
| 2011/0007944 A1 | 1/2011 | Atrazhev et al. |
| 2011/0097988 A1 | 4/2011 | Lord |
| 2011/0231137 A1 | 9/2011 | Funck et al. |
| 2012/0016525 A1 | 1/2012 | Davis |
| 2012/0185728 A1 | 7/2012 | Guo et al. |
| 2012/0276517 A1 | 11/2012 | Banaszuk et al. |
| 2012/0330465 A1 | 12/2012 | O'Neill et al. |
| 2016/0064940 A1 | 3/2016 | De La Cropte De Chanterac et al. |
| 2017/0167904 A1 | 6/2017 | Sathyanarayana et al. |
| 2017/0295058 A1 | 10/2017 | Gottschalk et al. |
| 2019/0154480 A1 | 5/2019 | Schob et al. |
| 2019/0170549 A1 | 6/2019 | Wetzel et al. |
| 2019/0250647 A1 | 8/2019 | Alcala Perez et al. |
| 2019/0390991 A1 | 12/2019 | Pape et al. |
| 2020/0209030 A1 | 7/2020 | Kleinitz et al. |
| 2020/0400341 A1 | 12/2020 | Holoch et al. |
| 2021/0010894 A1 | 1/2021 | Fujii et al. |
| 2021/0048329 A1 | 2/2021 | Wusterbarth et al. |
| 2021/0208611 A1 | 7/2021 | Trikha et al. |

OTHER PUBLICATIONS

FX-15 "Classic" HVAC/R Controller production Bulletin, Johnson Controls, Issue Date Oct. 2002 (36 pages).

Srinivasarengan et al., "Flux estimation from Vanadium and Cobalt Self Powered Neutron Detectors (SPNDs): Nonlinear exact inversion and Kalman filter approaches", 2012 American Control Conference, Montreal, Canada Jun. 27-Jun. 29, 2012 (6 pages).

Xiong et al., "Adaptive Robust Extended Kalman Filter," Kalman Filter: Recent Advances and Applications chapter 5, I-Tech, Croatia, Apr. 2009 (24 pages).

Bahari et al., "Intelligent Error Covariance Matric Resetting for Maneuver Target Tracking," Journal of Applied Sciences, Dec. 2008, vol. 8, Issue 12 (pp. 2279-2285).

Welch et al., "An Introduction to the Kalman Filter," Jul. 24, 2006, (16 pages).

REDUCED LENGTH VALVE ASSEMBLY WITH ULTRASONIC FLOW SENSOR

CROSS-REFERENCE TO RELATED PATENT APPLICATION

This application is a continuation of U.S. patent application Ser. No. 16/709,542 filed Dec. 10, 2019, which is incorporated herein by reference in its entirety.

BACKGROUND

The present disclosure relates generally to the field of building management systems and associated devices and more particularly to an assembly with a reduced length valve coupled to an ultrasonic flow sensor. The assembly includes a valve that regulates a flow of a fluid through a conduit, pipe, or tube depending on a setpoint controlled by a flow value output actuator. The actuator determines the setpoint based on sensing data provided by a flow sensor. Existing flow sensor assemblies are arranged upstream or downstream in reference to the valve along with conduit (e.g. straight pipe) in between the valve and sensor to ensure accurate sensor readings. Because the conduit increases the overall size of the valve assembly and increases the number of parts in the assembly, it would be advantageous to decrease or eliminate the conduit while maintaining accurate flow sensor data.

The flow sensor assembly typically includes one or more transducers with acoustic reflectors. Many existing HVAC flow sensors are largely dependent on a distance variable, L, between the acoustic reflectors to control the signal-to-noise-ratio ("S/N"). Minimizing L would be desirable from a cost, handling, and installation point of view.

SUMMARY

One implementation of the present disclosure is a system for controlling a flow rate of a fluid through a valve, according to some embodiments. In some embodiments, the system includes a controller. In some embodiments, the controller is configured to receive a raw flow rate measurement from a flow rate sensor assembly configured to measure the flow rate. In some embodiments, the controller is further configured to apply a flow rate measurement filter to the raw flow rate measurement to generate a filtered flow rate measurement. In some embodiments, the controller is further configured to control actuation of an actuator configured to change the flow rate using the filtered flow rate measurement. In some embodiments, the controller is configured to automatically adjust the flow rate measurement filter in response to detecting an event that causes stoppage of the actuation of the actuator.

In some embodiments, the controller is further configured to control actuation of the actuator using the raw flow rate measurement for flow rate measured during actuation of the actuator to change the flow rate and using the filtered flow rate measurement for flow rate measured during stoppage of the actuation of the actuator.

In some embodiments, the flow rate measurement filter includes a memory of previously recorded values of the flow rate and the controller is configured to reset the flow rate measurement filter by updating one or more parameters of a process noise covariance matrix in response to detecting the event that causes stoppage of the actuation of the actuator.

In some embodiments, adjusting the flow rate measurement filter includes clearing a memory of previously recorded values of the flow rate so that the previously recorded values of the flow rate are not used by the flow rate measurement filter to generate the filtered flow rate measurement.

In some embodiments, the flow rate sensor assembly includes a first ultrasonic transducer and a second ultrasonic transducer.

In some embodiments, the first ultrasonic transducer and the second ultrasonic transducer are located such that a first portion of a flow path between the first ultrasonic transducer and the second ultrasonic transducer is parallel to the flow of fluid, and a second portion of the flow path between the first ultrasonic transducer and the second ultrasonic transducer is perpendicular to the flow of fluid.

In some embodiments, the first ultrasonic transducer and the second ultrasonic transducer are located such that the flow of fluid passes between the first ultrasonic transducer and the second ultrasonic transducer.

In some embodiments, a flow path between the first ultrasonic transducer and the second ultrasonic transducer is positioned at a first angle relative to the flow of fluid.

Another implementation of the present disclosure is an ultrasonic flow sensor assembly configured to measure a flow of fluid through a conduit, according to some embodiments. In some embodiments, the ultrasonic flow sensor assembly includes a first and second ultrasonic transducer and a processing circuit. In some embodiments, the first and second ultrasonic transducers are fixedly coupled with the conduit and separated from each other by a distance less than or substantially equal to twice a diameter of the conduit. In some embodiments, the processing circuit is configured to operate the first ultrasonic transducer to emit an ultrasonic signal along a flow path of the fluid in the conduit by providing a voltage or current to the first ultrasonic transducer. In some embodiments, the processing circuit is also configured to receive a voltage or current from the second ultrasonic transducer in response to the second ultrasonic transducer receiving the ultrasonic signal emitted by the first ultrasonic transducer. In some embodiments, the processing circuit is also configured to obtain a raw measurement of a flow rate of the fluid in the conduit using the received voltage or current. In some embodiments, the processing circuit is configured to generate a filtered measurement of the flow rate of the fluid using a filter and the raw measurement.

In some embodiments, the ultrasonic flow sensor assembly further includes a structural member, separate from the conduit. In some embodiments, the structural extends between the first ultrasonic transducer and the second ultrasonic transducer. In some embodiments, the structural member is fixedly coupled with the first ultrasonic transducer and the second ultrasonic transducer and maintains a fixed distance between the first ultrasonic transducer and the second ultrasonic transducer.

In some embodiments, the first ultrasonic transducer and the second ultrasonic transducer are each configured to receive an ultrasonic signal within the conduit and convert the received ultrasonic signal to a voltage or current. In some embodiments, the first ultrasonic transducer and the second ultrasonic transducer are each also configured to receive a voltage or current and emit an ultrasonic signal at least partially along the flow path of the fluid in the conduit.

In some embodiments, the ultrasonic flow sensor assembly also includes an actuator operatively coupled with the processing circuit. In some embodiments, the processing circuit is configured to operate the actuator to affect the flow rate of the fluid through the conduit using the filtered measurement of the flow rate of the fluid.

In some embodiments, the processing circuit is configured to use the filtered measurement of the flow rate of the fluid to operate the actuator when the actuator is within a position setpoint plus or minus a deadband and maintain a current value of the position setpoint when the actuator is outside of the deadband of the position setpoint.

In some embodiments, the processing circuit is configured to reset the filter in response to the actuator reaching a position setpoint or in response to an event that causes stoppage of the actuator. In some embodiments, resetting the filter includes clearing a memory of the filter of previously obtained values of the raw measurement of the flow rate.

In some embodiments, clearing the memory includes adjusting one or more parameters of the filter.

In some embodiments, the ultrasonic flow sensor assembly further includes a first acoustic reflector and a second acoustic reflector. In some embodiments, the first and second acoustic reflectors are configured to cooperatively direct the ultrasonic signal emitted by the first ultrasonic transducer along the flow path of the fluid and to the second ultrasonic transducer.

In some embodiments, the first ultrasonic transducer and the second ultrasonic transducer are oriented to emit and receive the ultrasonic signal in a direction perpendicular to the flow path of the fluid.

In some embodiments, the first ultrasonic transducer and the second ultrasonic transducer are positioned on opposite sides of the conduit and the first ultrasonic transducer is configured to emit the ultrasonic signal towards the second ultrasonic transducer along a path angularly offset from the flow path of the fluid.

Another implementation of the present disclosure is a method for measuring a flow rate of fluid through a conduit, according to some embodiments. In some embodiments, the method includes measuring the flow rate of the fluid and generating a raw flow rate measurement. In some embodiments, the method also includes applying a flow rate measurement filter to the raw flow rate measurement to generate a filtered flow rate measurement. In some embodiments, the method includes controlling actuation of an actuator to change the flow rate using the filtered flow rate measurement. In some embodiments, the method includes automatically adjusting the flow rate measurement filter in response to detecting an event that causes stoppage of the actuation of the actuator.

In some embodiments, the method further includes controlling actuation of the actuator using the raw flow rate measurement for flow rate measured during actuation of the actuator to change the flow rate and using the filtered flow rate measurement for flow rate measured during stoppage of the actuation of the actuator.

DETAILED DESCRIPTION

Overview

Before turning to the FIGURES which illustrate example embodiments, it should be understood that the application is not limited to the details or methodology set forth in the following description or illustrated in the FIGURES. It should also be understood that the phraseology and terminology employed herein is for the purpose of description only and should not be regarded as limiting. For example, the embodiments of systems and methods discussed herein can be relevant to any of a variety of circumstances when operating a control valve assembly can be useful.

The embodiments and implementation of the systems and methods disclosed herein improve current HVAC systems by developing an alternate solution to placing conduit in between a valve body and a flow sensor body. Current systems are generally configured to require conduit prior to the flow sensor body such that an accurate flow measurement can be achieved. However, implementation of the conduit increases the overall size and number of parts required in the valve assembly. Accordingly, systems and methods disclosed herein enable a customer to eliminate the requirement of conduit (e.g. straight pipe) before the flow sensor body.

The embodiments disclosed herein further improve current HVAC systems by developing an alternate solution to a required distance, L, in a flow sensor assembly that includes an acoustic reflector and a transducer. Current systems are generally configured to require the flow sensor assembly to have the distance L between the acoustic reflectors, such that an accurate flow measurement can be achieved. Distance L is necessary to control a signal-to-noise-ratio ("S/N"), which will vary depending on a conduit diameter, D. However, implementation of the distance, L, can increase the overall size of the valve assembly, which may make installation in some locations difficult. Accordingly, systems and methods disclosed herein enable a customer to eliminate the requirement of distance, L between the acoustic reflectors allowing an overall shorter sensor body without losing control of the S/N. As such, the systems, and methods implementations disclosed herein improve cost savings, current handling and installation methods, and compliance by providing functionalities that are novel and non-obvious improvements over current systems.

Building and HVAC System

Figure 1:
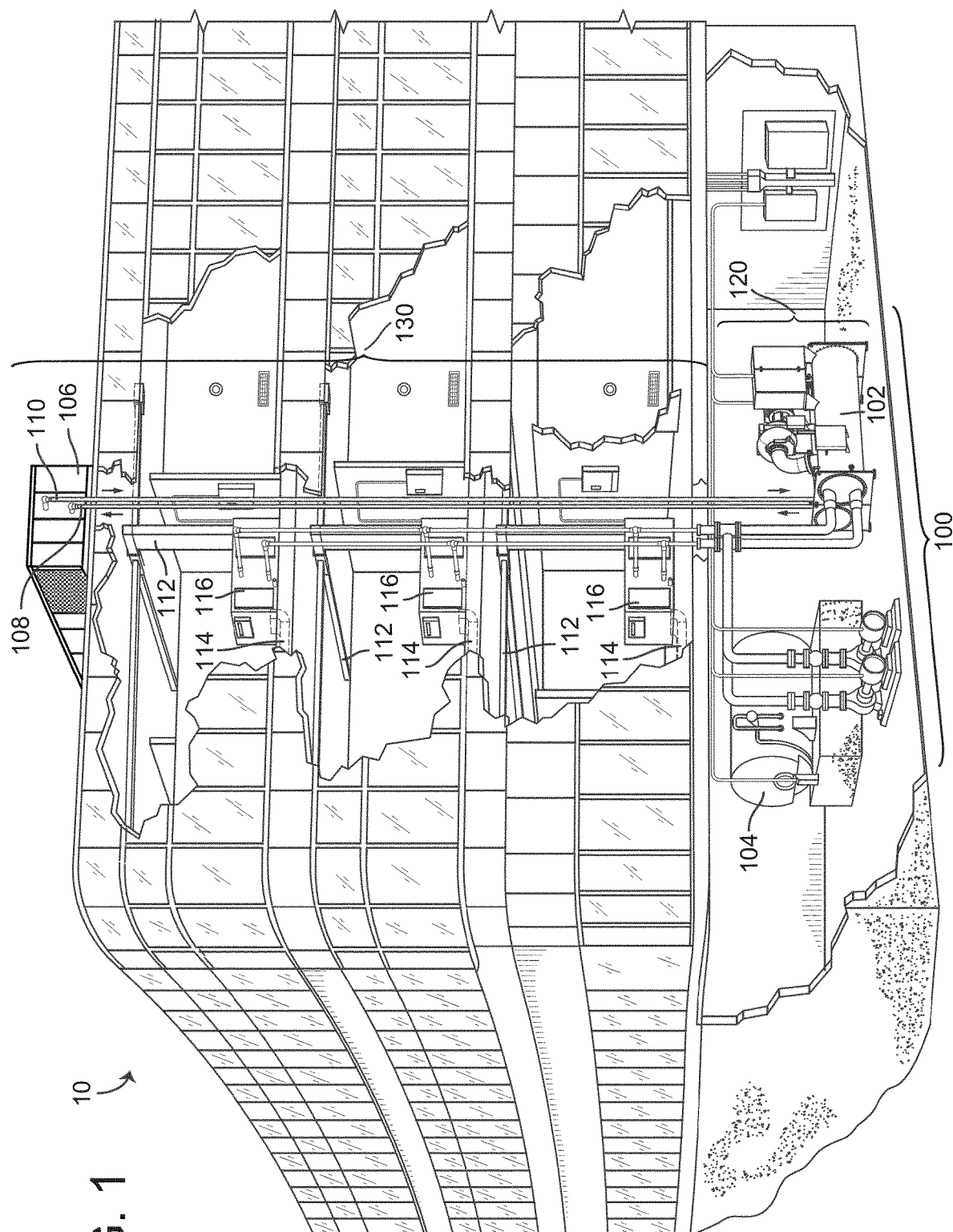
FIG. 1 is a drawing of a building equipped with a heating, ventilating, or air conditioning (HVAC) system and a building management system (BMS), according to some embodiments.

Referring to FIGS. 1-4, an exemplary BMS and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, and a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
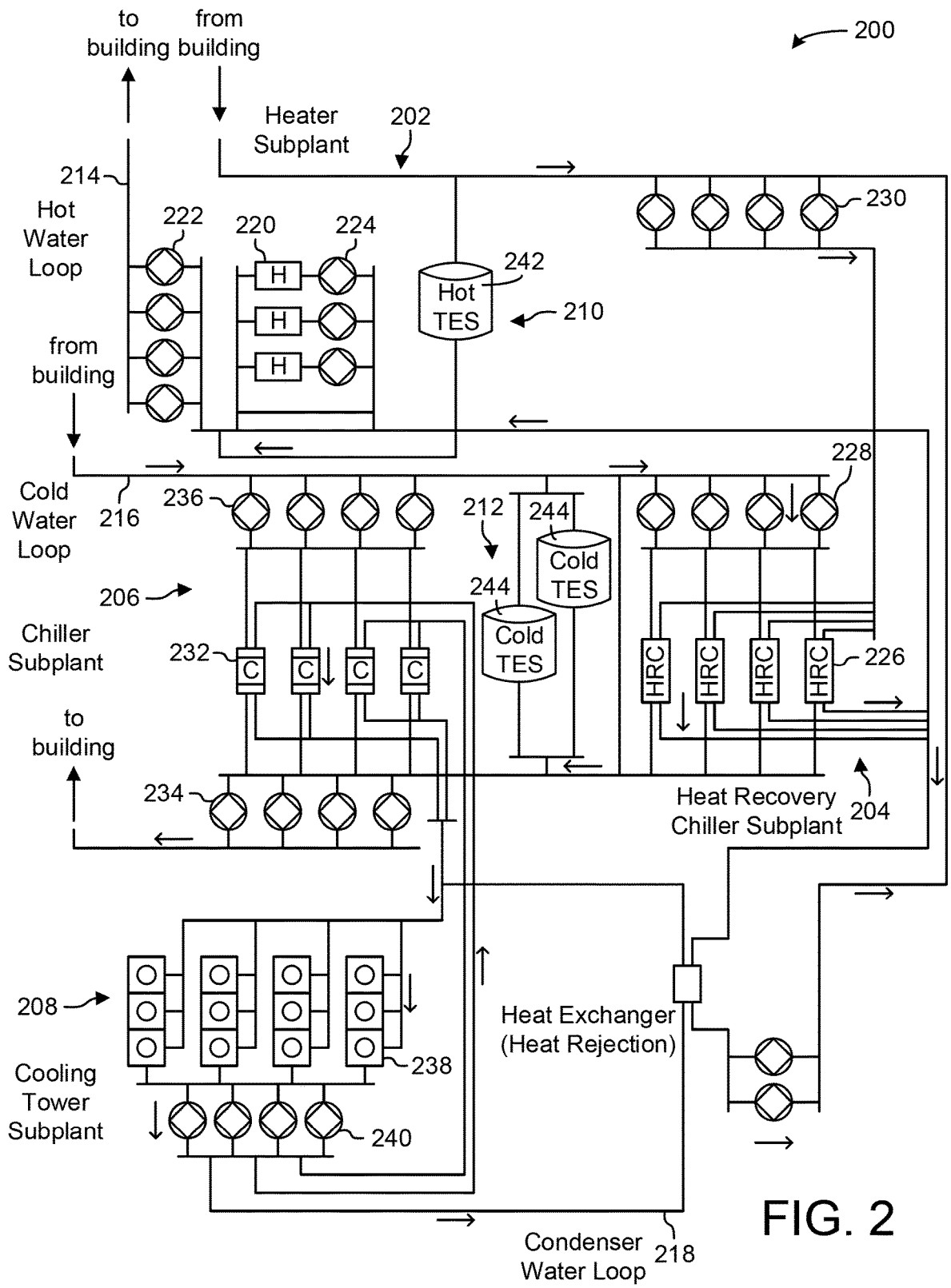
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
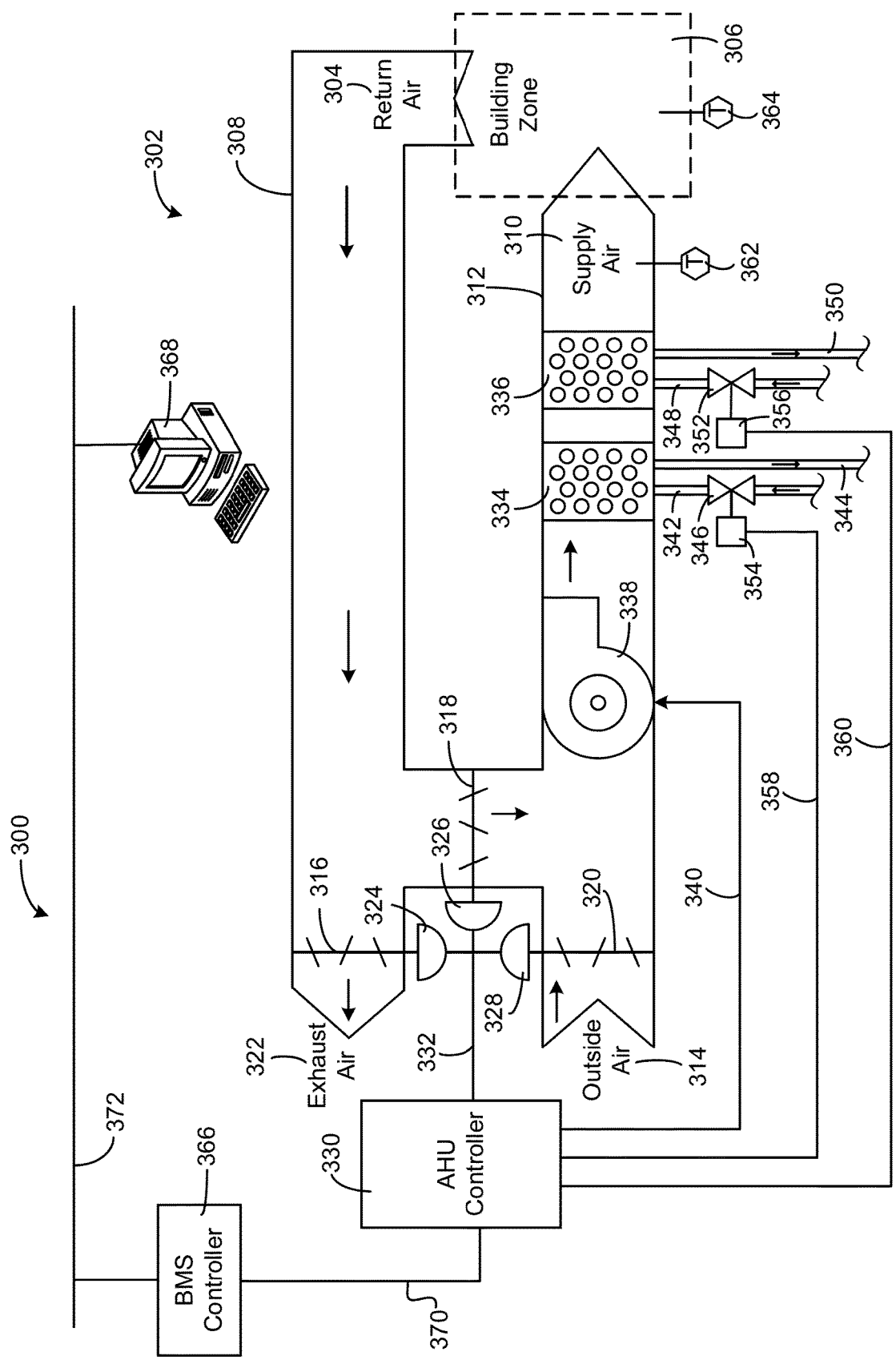
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 may communicate with BMS controller 366 and/or AHU controller 330 via communications link 372.

Figure 4:
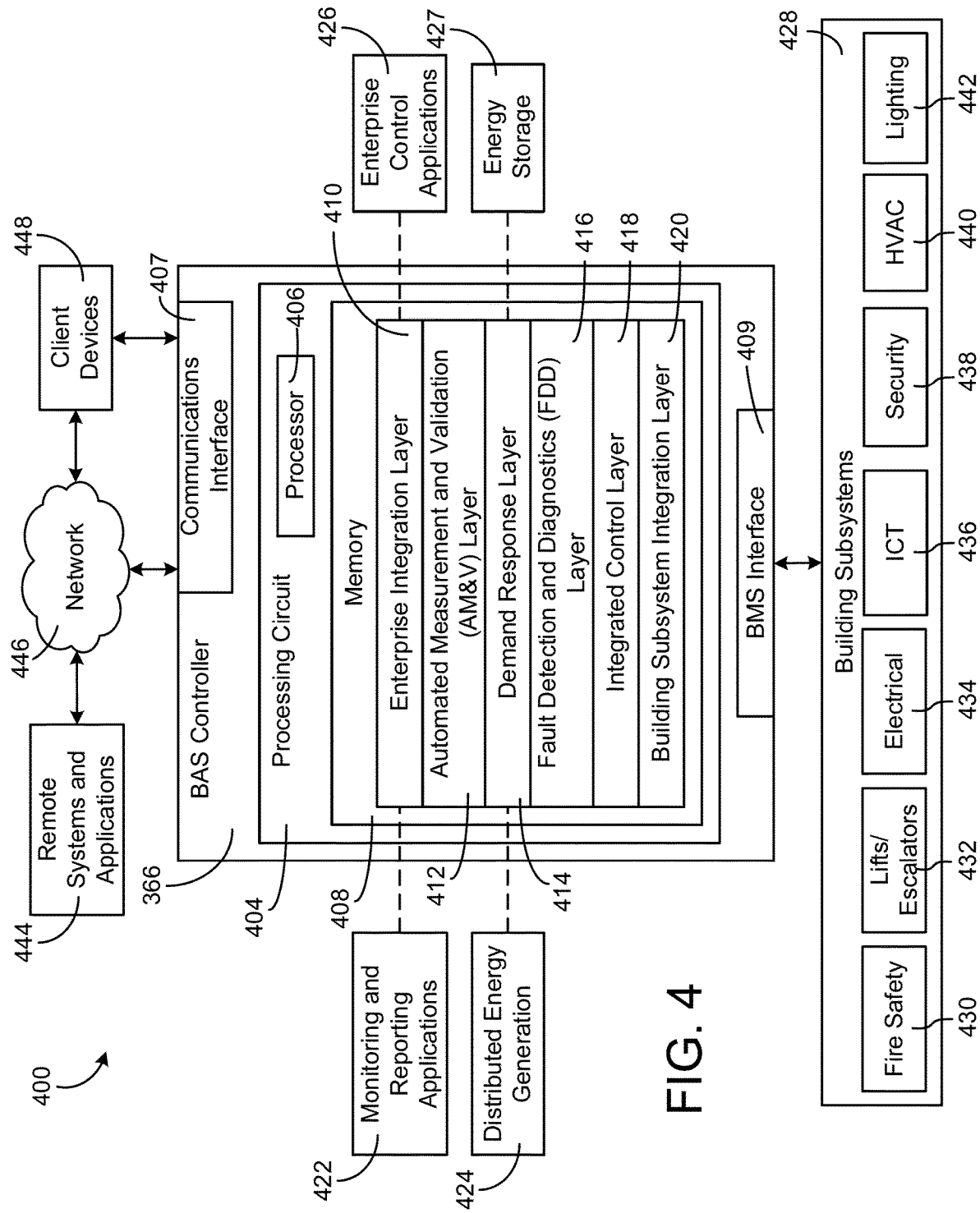
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.)

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multivendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super system. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Valve Assembly

Figure 5:
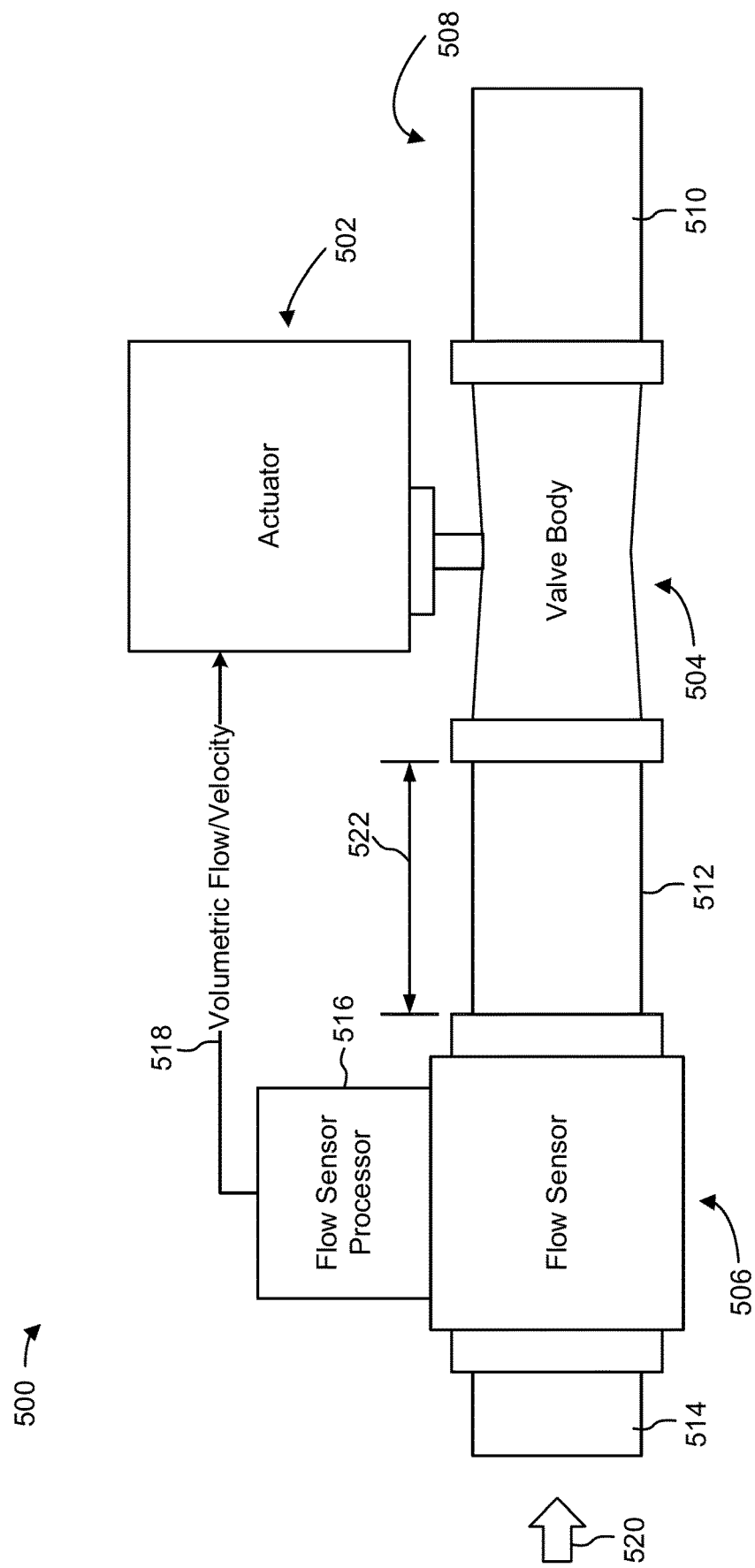
FIG. 5 is a schematic diagram of an electronic pressure-independent control valve assembly that can be implemented in the HVAC system of FIG. 1, according to some embodiments.

Referring now to FIG. 5, a block diagram of an electronic pressure-independent control valve assembly 500 is shown, according to some embodiments. Valve assembly 500 can be used in HVAC system 100, waterside system 200, airside system 300, or BMS 400, as described with reference to FIGS. 1-4. Valve assembly 500 is shown to include an actuator 502 coupled to a valve 504. For example, actuator 502 can be a damper actuator, a valve actuator, a fan actuator, a pump actuator, or any other type of actuator that can be used in an HVAC system or BMS. In various embodiments, actuator 502 can be a linear actuator (e.g., a linear proportional actuator), a non-linear actuator, a spring return actuator, or a non-spring return actuator.

Valve 504 can be any type of control device configured to control an environmental parameter in an HVAC system, including a 2-way or 3-way two position electric motorized valve, a ball isolation valve, a floating point control valve, an adjustable flow control device, or a modulating control valve. In some embodiments, valve 504 may regulate a flow 520 of fluid through a conduit, pipe, tubular member, or tube (e.g., conduit 508) in a waterside system (e.g., waterside system 200, shown in FIG. 2). Conduit 508 may include upstream conduit sections 512 and 514 and downstream conduit section 510.

In some embodiments, actuator 502 and valve 504 are located within a common integrated device chassis or housing. In short, actuator 502 and valve 504 may not be packaged as separate devices, but as a single device. Reducing the number of devices in an HVAC system may provide numerous advantages, most notably in time and cost savings during the installation process. Because it is not necessary to install actuator 502 and valve 504 as separate devices and then make a connection between them, technicians performing the installation may require less specialized training and fewer tools. Other advantages of a single device may include simplification of control and troubleshooting functions. However, in some embodiments, actuator 502 and valve 504 are packaged as separate devices that can be communicably coupled via a wired or a wireless connection.

Still referring to FIG. 5, a flow sensor assembly 506 is shown to be coupled to upstream conduit sections 512 and 514. Conduit 512 may be a straight connecting conduit having a length 522 that is installed between the flow sensor assembly 506 and the valve 504 to ensure proper functioning of the flow sensor assembly 506. Flow sensor assembly 506 can be configured to measure a flow rate or a velocity of fluid passing through conduit 508. Flow sensor assembly 506 can be any type of device (e.g., ultrasonic detector) configured to measure the flow rate or velocity using any applicable flow sensing method.

Still referring to FIG. 5, flow sensor assembly 506 may be fixedly coupled with a flow sensor processor 516. Flow sensor processor 516 can be communicably coupled via a wired or a wireless connection to actuator 502 and a measured volumetric flow and/or a velocity data 518 from flow rate sensor assembly 506 can be provided to actuator device 502. Flow sensor processor 516 can be implemented as a general purpose processor, an application specific integrated circuit (ASIC), one or more field programmable gate arrays (FPGAs), a group of processing components, or other suitable electronic processing components.

Figure 6:
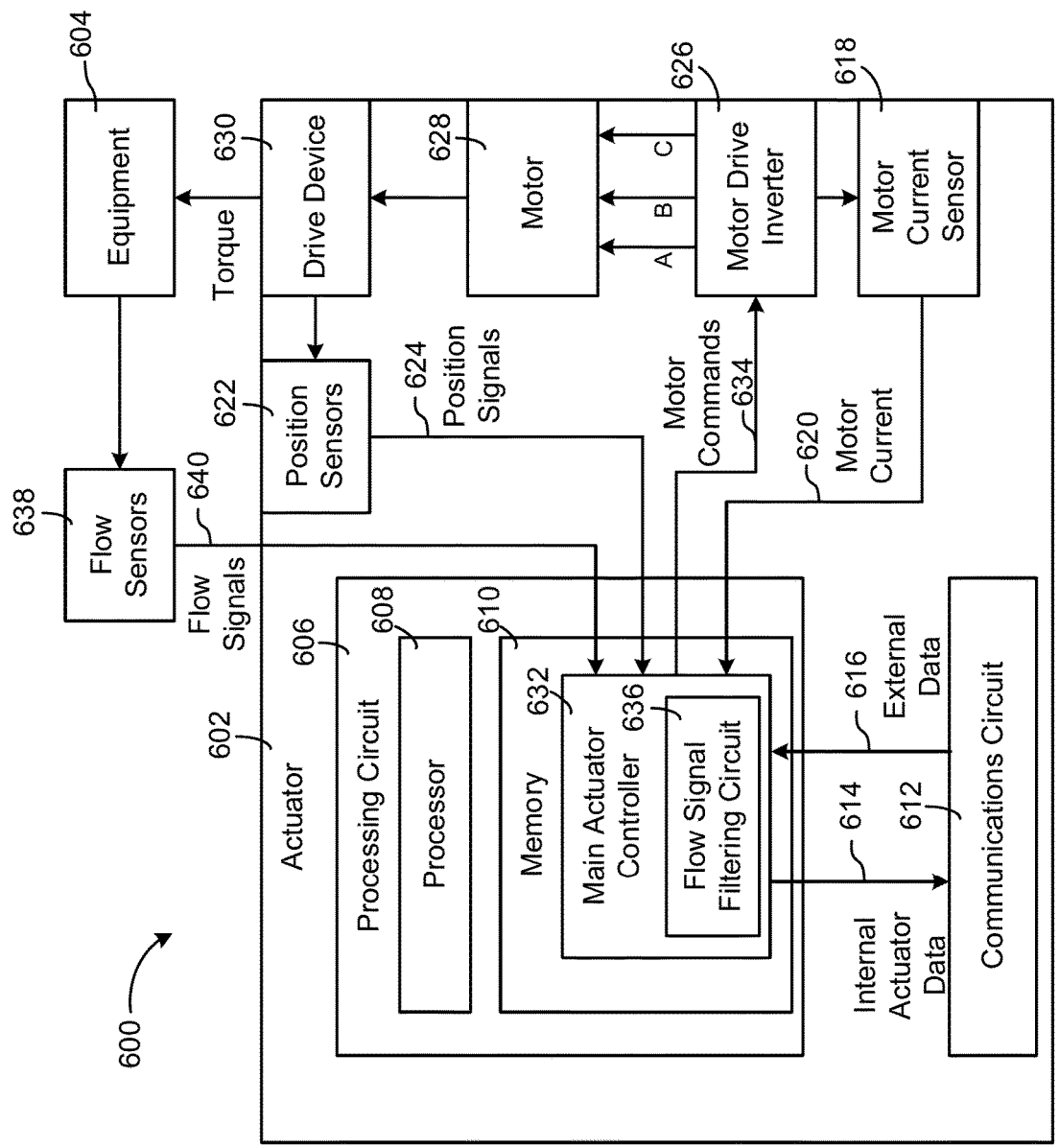
FIG. 6 is a block diagram of a signal filtering pressure disturbance rejection valve assembly that can be implemented in the HVAC system of FIG. 1, according to some embodiments.

Turning now to FIG. 6, a block diagram of a signal filtering pressure disturbance rejection valve assembly 600 is shown, according to some embodiments. Valve assembly 600 can be used in HVAC system 100, waterside system 200, airside system 300, or BMS 400, as described with reference to FIGS. 1-4. Valve assembly 600 may represent a more detailed version of valve assembly 500. For example, valve assembly 600 is shown to include actuator 602, which can be identical or substantially similar to actuator 502 in valve assembly 500. Actuator 602 can be configured to operate equipment 604. Equipment 604 may include any type of system or device that can be operated by an actuator (e.g., a valve, a damper). In an exemplary embodiment, actuator 602 and equipment 604 (e.g., a valve) are packaged within a common integrated device chassis.

Actuator 602 is shown to include a processing circuit 606 communicably coupled with a motor 628 (e.g., a rotary motor, a mechanical transducer, etc., or any other device configured to convert electrical energy to mechanical work). In some embodiments, motor 628 is a brushless DC (BLDC) motor. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external control data 616 (e.g., position setpoints, speed setpoints, etc.) from communications circuit 612, position signals 624 from position sensors 622, and flow signals 640 from one or more flow sensors 638. Main actuator controller 632 may be configured to determine the position of motor 628 and/or drive device 630 based on position signals 624. In some embodiments, main actuator controller 632 receives data from additional sources. For example, motor current sensor 618 may be configured to measure the electric current provided to motor 628. Motor current sensor 618 may generate a feedback signal indicating the motor current 620 and may provide this signal to main actuator controller 632 within processing circuit 608.

System fluctuations (e.g., pressure fluctuations) may result in high variance in the flow signals 640 received from the flow sensors 638 and erratic control of the valve member position. Various techniques may therefore be utilized to minimize variance in ultrasonic measurements. Flow signal filtering circuit 636 can be configured to implement various statistical filtering techniques (e.g. low pass filtering, Kalman filtering, etc.). In some embodiments, Kalman filters may be implemented to estimate a joint probability distribution for a flow sensor measurement at each time step. In other embodiments, low pass filtering techniques may be utilized to remove high frequency noise. The cutoff frequency for the filter may be based on various valve characteristics (e.g., valve size, type of valve). Because higher flow velocities lead to noisier measurements, any physical valve characteristic that alters the flow velocity through the valve may be considered in choosing a cutoff frequency for the filter. Filters may be enabled or disabled when the flow rate through the valve is changing rapidly. In still further embodiments, sensor fusion techniques to combine measurements from multiple ultrasonic sensors may be utilized. Each of the mathematical techniques described above may be utilized in isolation or in combination with one or more other mathematical techniques.

Still referring to FIG. 6, processing circuit 608 may be configured to output a pulse width modulated (PWM) DC motor command 634 to control the speed of the motor. Motor 628 may be configured to receive a three-phase PWM voltage output (e.g., phase A, phase B, phase C) from motor drive inverter 626. The duty cycle of the PWM voltage output may define the rotational speed of motor 628 and may be determined by processing circuit 606 (e.g., a microcontroller). Processing circuit 606 may increase the duty cycle of the PWM voltage output to increase the speed of motor 628 and may decrease the duty cycle of the PWM voltage output to decrease the speed of motor 628.

Motor 628 may be coupled to drive device 630. Drive device 630 may be a drive mechanism, a hub, or other device configured to drive or effectuate movement of a HVAC system component (e.g., equipment 604). For example, drive device may be configured to receive a shaft of a damper, a valve, or any other movable HVAC system component in order to drive (e.g., rotate) the shaft. In some embodiments, actuator 602 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of the motor 628 and/or drive device 630. Position sensors 622 may provide position signals 624 to processing circuit 606. Main actuator controller 632 may use position signals 624 to determine whether to operate the motor 628. For example, main actuator controller 632 may compare the current position of drive device 630 with a position setpoint received via external data input 616 and may operate the motor 628 to achieve the position setpoint.

Actuator 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP, etc.). In some embodiments, communications circuit 612 is an integrated circuit, chip, or microcontroller unit (MCU) configured to bridge communications actuator 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for the pressure disturbance rejection valve assembly 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 612 may transmit external data 616 to main actuator controller 632. External data 616 may include, for example, position setpoints, speed setpoints, control signals, configuration parameters, end stop locations, stroke length parameters, commissioning data, equipment model data, actuator firmware, actuator software, or any other type of data which can be used by actuator 602 to operate the motor 628 and/or drive device 630.

In some embodiments, external data 616 is a DC voltage control signal. Actuator 602 can be a linear proportional actuator configured to control the position of drive device 630 according to the value of the DC voltage received. For example, a minimum input voltage (e.g., 0.0 VDC) may correspond to a minimum rotational position of drive device 630 (e.g., 0 degrees, −5 degrees, etc.), whereas a maximum input voltage (e.g., 10.0 VDC) may correspond to a maximum rotational position of drive device 630 (e.g., 90 degrees, 95 degrees, etc.). Input voltages between the minimum and maximum input voltages may cause actuator 602 to move drive device 630 into an intermediate position between the minimum rotational position and the maximum rotational position. In other embodiments, actuator 602 can be a non-linear actuator or may use different input voltage ranges or a different type of input control signal (e.g., AC voltage or current) to control the position and/or rotational speed of drive device 630.

In some embodiments, external data 616 is an AC voltage control signal. Communications circuit 612 may be configured to transmit an AC voltage signal having a standard power line voltage (e.g., 120 VAC or 230 VAC at 50/60 Hz). The frequency of the voltage signal can be modulated (e.g., by main actuator controller 632) to adjust the rotational position and/or speed of drive device 630. In some embodiments, actuator 602 uses the voltage signal to power various components of actuator 602. Actuator 602 may use the AC voltage signal received via communications circuit 612 as a control signal, a source of electric power, or both. In some embodiments, the voltage signal is received from a power supply line that provides actuator 602 with an AC voltage having a constant or substantially constant frequency (e.g., 120 VAC or 230 VAC at 50 Hz or 60 Hz). Communications circuit 612 may include one or more data connections (separate from the power supply line) through which actuator 602 receives control signals from a controller or another actuator (e.g., 0-10 VDC control signals).

Feedback Control System

Figure 7:
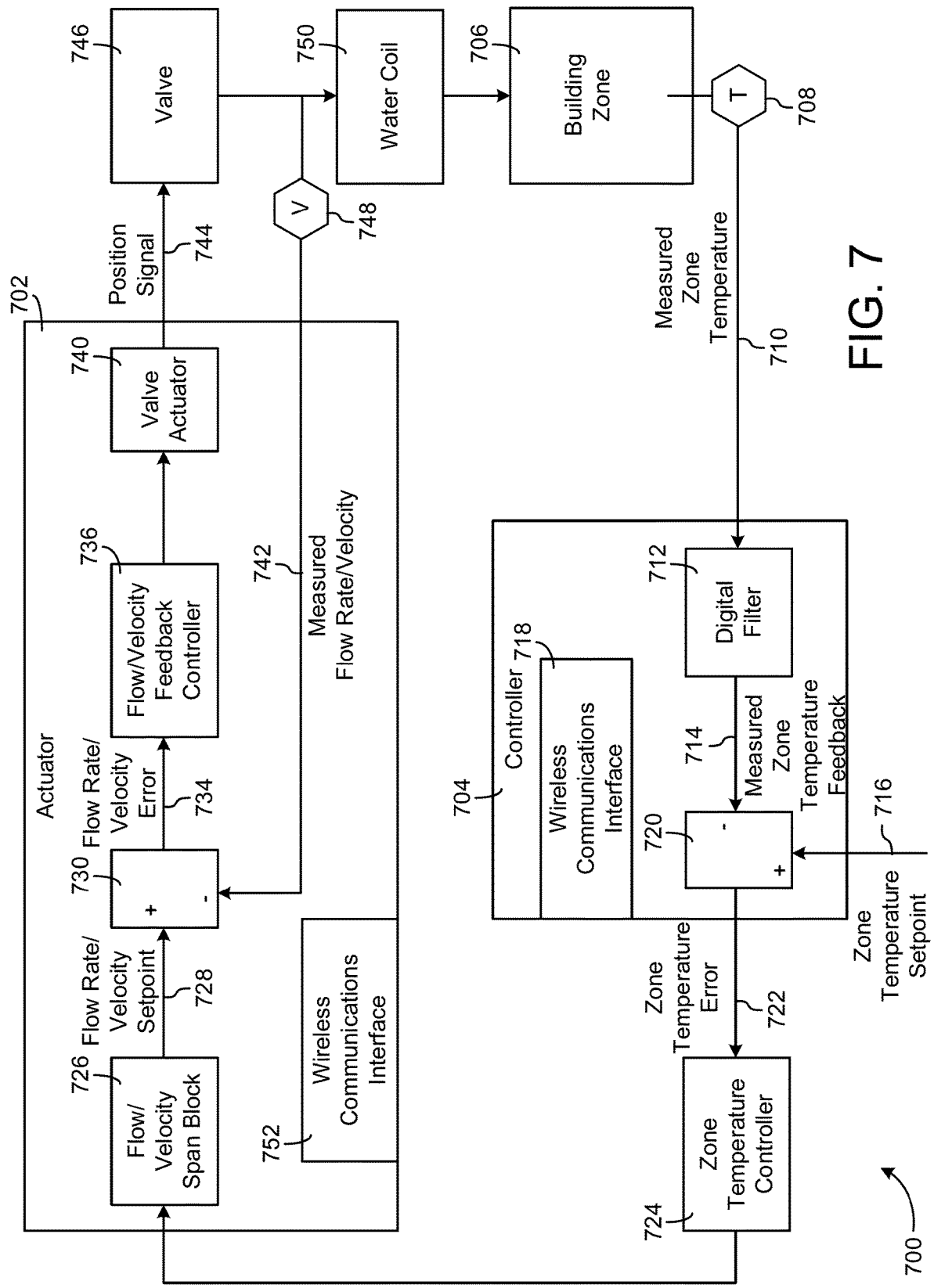
FIG. 7 is a block diagram of a pressure disturbance rejection valve assembly within a feedback control system that can be implemented in the HVAC system of FIG. 1, according to some embodiments.

Turning now to FIG. 7, a block diagram of an actuator device 702 within a feedback control system 700 is shown. In some embodiments, the feedback control system 700 is a cascaded feedback control system. In a cascaded control system, a primary controller (e.g., controller 704) generates a control signal that serves as the setpoint for a secondary controller (e.g., flow/velocity feedback controller 736). In some embodiments, the control path including the control signal generated by the primary controller may be referred to as an "outer loop," while the control path including the secondary controller may be referred to as an "inner loop." In some embodiments, cascaded control system 700 is a component or subsystem of HVAC system 100, waterside system 200, airside system 300, or BMS 400, as described with reference to FIGS. 1-4.

Cascaded control system 700 may include, among other components, actuator device 702, controller 704, building zone 706, zone temperature controller 724, and valve 746. In some embodiments, controller 704 is a primary controller for the components of an HVAC system (e.g., HVAC system 100) within the outer control loop of cascaded control system 700. In other embodiments, controller 704 is a thermostat or a BMS controller (e.g., for BMS 400). In still further embodiments, controller 704 is a user device configured to run a building management application (e.g., a mobile phone, a tablet, a laptop). Controller 704 may receive data from temperature sensor 708. Temperature sensor 708 may be any type of sensor or device configured to measure an environmental condition (e.g., temperature) of a building zone 706. Building zone 706 may be any subsection of a building (e.g., a room, a block of rooms, and a floor).

Controller 704 is shown to include a digital filter 712, a wireless communications interface 718, and a comparator 720. Measured zone temperature data 710 from temperature sensor 708 may be received as an input signal to digital filter 712. Digital filter 712 may be configured to convert the measured zone temperature data 710 into a measured zone temperature feedback signal 714 that may be provided as an input to comparator 720. In some embodiments, digital filter 712 is a first order low pass filter. In other embodiments, digital filter 712 may be a low pass filter of a different order or a different type of filter.

Controller 704 is further shown to include wireless communications interface 718. In some embodiments, wireless communications interface 718 may communicate data from controller 704 to communications interface 752 of actuator device 702. In other embodiments, communications interfaces 718 and 752 may communicate with other external systems or devices. Communications via interface 718 may be direct (e.g., local wireless communications) or via a communications network (e.g., a WAN, the Internet, a cellular network). For example, interfaces 718 and 752 may include a Wi-Fi transceiver for communicating via wireless communications network. In another example, one or both interfaces 718 and 752 may include cellular or mobile phone communications transceivers. In some embodiments, multiple controllers and smart actuator devices may communicate using a mesh topology. In other embodiments, communications interfaces 718 and 752 may be configured to transmit smart actuator device data (e.g., a fault status, an actuator and/or valve position) to an external network. In still further embodiments, communications interfaces 718 and 752 are connected via a wired, rather than wireless, network.

Comparator 720 may be configured to compare the measured zone temperature feedback signal 714 output from digital filter 712 with a zone temperature setpoint value 716. Comparator 720 may then output a temperature error signal 722 that is received by zone temperature controller 724. Comparator 720 may be a discrete electronics part or implemented as part of controller 704. If comparator 720 determines that the zone temperature feedback signal 714 is higher than the zone temperature setpoint value 716 (i.e., building zone 706 is hotter than the setpoint value), zone temperature controller 724 may output a control signal that causes actuator device 702 to modify the flow rate through water coil 750 such that cooling to building zone 706 is increased. If comparator 720 determines that the zone temperature feedback signal 714 is lower than the zone temperature setpoint value 716 (i.e., building zone 706 is cooler than the setpoint value), zone temperature controller 724 may output a control signal that causes actuator device 702 to modify the flow rate through water coil 750 such that heating to building zone 706 is increased.

In various embodiments, zone temperature controller 724 is a pattern recognition adaptive controller (PRAC), a model recognition adaptive controller (MRAC), or another type of tuning or adaptive feedback controller. Adaptive control is a control method in which a controller may adapt to a controlled system with associated parameters which vary, or are initially uncertain. In some embodiments, zone temperature controller 724 is similar or identical to the adaptive feedback controller described in U.S. Pat. No. 8,825,185, granted on Sep. 2, 2014, the entirety of which is herein incorporated by reference.

Still referring to FIG. 7, actuator device 702 is shown to include a flow/velocity span block 726, a comparator 730, a flow/velocity feedback controller 736, a valve actuator 740, and a communications interface 752. Zone temperature error 722 output from comparator 720 may be transmitted to actuator 702 via zone temperature controller 724. Flow/velocity span block 726 may be configured to enforce allowable maximum and minimum flow range limits on the received zone temperature error 722. For example, a technician installing the components of cascaded control system 700 or an administrator of HVAC system 100 may input a maximum and/or a minimum flow range limit for the flow/velocity span block 726. In some embodiments, the flow range limits are transmitted via mobile device (e.g., a smart phone, a table) and are received via communications interface 752 of actuator device 702. In other embodiments, the flow range limits are transmitted to interface 752 via wired network.

Comparator 730 may compare the flow rate/velocity setpoint 728 output received from flow/velocity span block 726 to measured flow rate/velocity data. Measured flow rate velocity data may be received from flow rate sensor 748. Comparator 730 may be a discrete electronics part or implemented as part of flow/velocity feedback controller 736. In some embodiments, comparator 730 may output a flow rate/velocity error signal 734 to flow/velocity feedback controller 736. For example, if comparator 730 determines that flow rate/velocity setpoint 728 is higher than measured flow rate/velocity 742, comparator 730 may generate a flow rate/velocity error signal 734 that causes flow/velocity feedback controller 736 to operate valve actuator 740 to increase the flow rate/velocity through valve 746. Conversely, if comparator 730 determines that flow rate/velocity setpoint 728 is lower than measured flow rate/velocity 742, comparator 730 may generate a flow rate/velocity error signal 734 that causes flow/velocity feedback controller 736 to operate valve actuator 740 to decrease the flow rate/velocity through valve 746.

Flow/velocity feedback controller 736 is configured to receive a flow rate/velocity error signal 734 from comparator 730 and to output a command signal to valve actuator 740 to drive the error signal to zero (i.e., to operate valve actuator 740 such that the measured flow rate/velocity 742 is equal to the flow rate/velocity setpoint 728). Similar to zone temperature controller 724, in various embodiments, flow/velocity feedback controller 736 is a proportional variable deadband controller (PVDC), a pattern recognition adaptive controller (PRAC), a model recognition adaptive controller (MRAC), or another type of tuning or adaptive feedback controller. In other embodiments, flow/velocity feedback controller 736 operates using state machine or proportional-integral-derivative (PID) logic. In some embodiments, flow/velocity feedback controller 736 is identical or substantially similar to the main actuator controller 632 as described with reference to FIG. 6.

Flow/velocity feedback controller 736 may be configured to output an actuator control signal (e.g., a DC signal, an AC signal) to valve actuator 740. In some embodiments, valve actuator 740 is identical or substantially similar to actuators 502 and 602 as described with reference to FIGS. 5 and 6. For example, valve actuator 740 may be a linear actuator (e.g., a linear proportional actuator), a non-linear actuator, a spring return actuator, or a non-spring return actuator. Valve actuator 740 may include a drive device coupled to valve 746 and configured to rotate a shaft of valve 746. In some embodiments, valve 746 is identical or substantially similar to valves 504 and 604 as described with reference to FIGS. 5 and 6. For example, in various embodiments, valve 746 may be a 2-way or 3-way two position electric motorized valve, a ball isolation valve, a floating point control valve, an adjustable flow control device, or a modulating control valve.

Still referring to FIG. 7, cascaded flow rate system is further shown to include a flow rate sensor 748. In some embodiments, flow rate sensor 748 is identical or substantially similar to the flow rate sensors 506 and 638 as described with reference to FIGS. 5 and 6. Flow rate sensor 748 may be disposed downstream of valve 746 to measure the flow rate and/or velocity of fluid exiting valve 746. In other embodiments, flow rate sensor 748 may be disposed upstream of valve 746. In some embodiments, flow rate sensor 748 is configured to have high sensitivity to changes in flow rate or velocity and, at the same time, to reject pressure fluctuations within the system. In further embodiments, cascaded control systems may be configured to reject fluctuations in system characteristics other than pressure. For example, these characteristics may include inlet water temperature, inlet air temperature, and airside mass flow. Once collected, measured flow rate and/or velocity data 742 from flow rate sensor 748 may be provided to comparator 730 of actuator device 702.

Fluid that passes through valve 746 may flow through water coil 750. In some embodiments, valve 746 is used to modulate an amount of heating or cooling provided to the supply air for building zone 706. In various embodiments, water coil 750 may be used to achieve zone setpoint temperature 716 for the supply air of building zone 706 or to maintain the temperature of supply air for building zone 706 within a setpoint temperature range. The position of valve 746 may affect the amount of heating or cooling provided to supply air via water coil 750 and may correlate with the amount of energy consumed to achieve a desired supply air temperature.

Reduced Length Ultrasonic Flow Sensor Assembly

Figure 8:
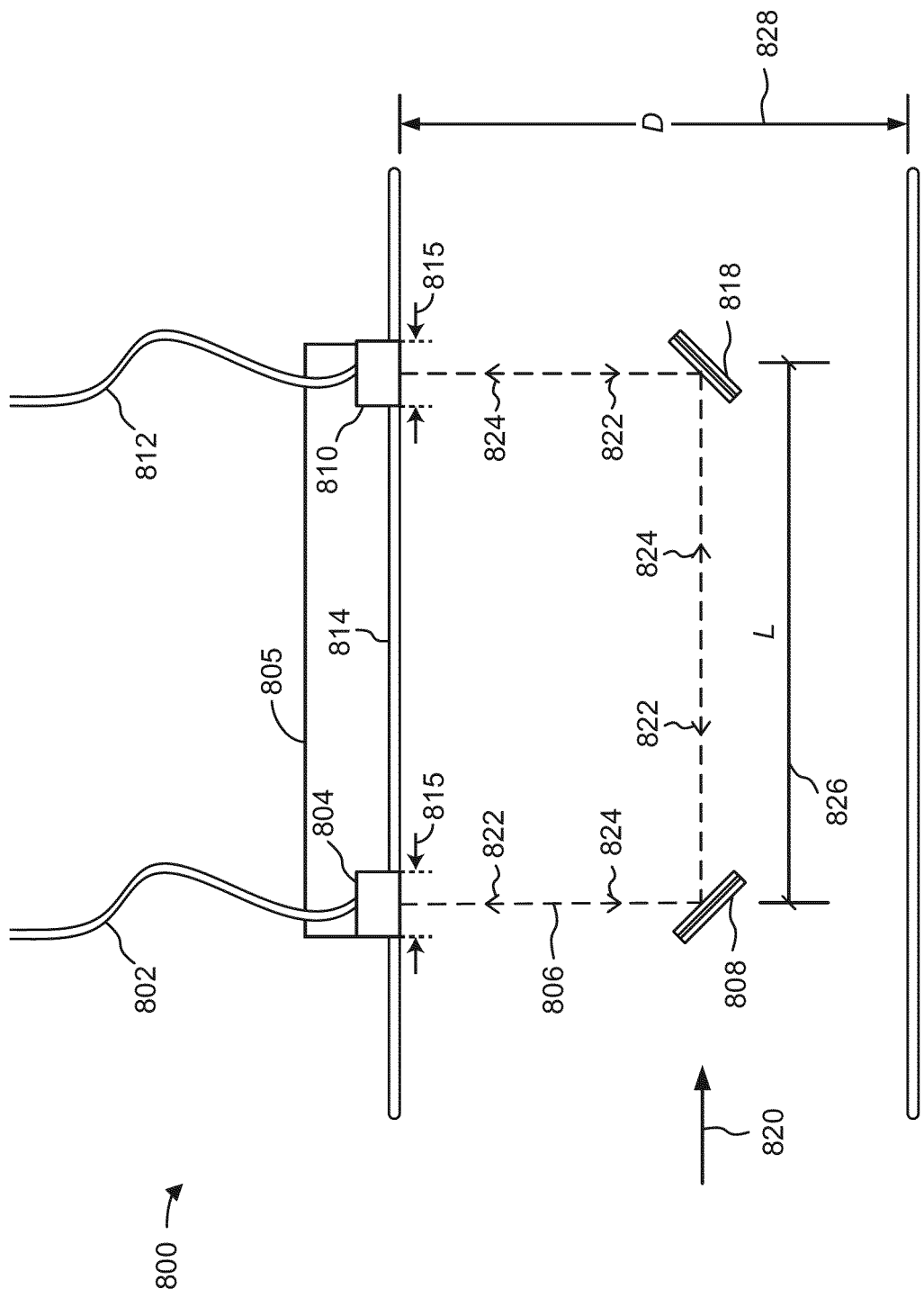
FIG. 8 is a schematic diagram of an ultrasonic flow sensor assembly that can be implemented in the electronic pressure-independent control valve assembly of FIG. 5, according to some embodiments.

Referring now to FIG. 8, a schematic diagram depicting the general operation of an ultrasonic flow sensor assembly 800 is shown, according to some embodiments. Ultrasonic flow sensor assembly 800 is shown to include ultrasonic transducers 804 and 810 (e.g. reversible-electric-ultrasonic-microphone-speakers), fixed to (e.g., fixedly coupled with) a pipe 814 with a nominal diameter 828, D. The ultrasonic transducers 804 and 810 are attached to (e.g., operatively and/or electrically coupled with) communication lines (e.g. network interfaces) 802 and 812 respectively. In some embodiments, communication lines 802 and 812 can be wireless. In other embodiments, communication lines 802 and 812 can be wired. In some embodiments, ultrasonic transducers 804 and 810 are disc-shaped members (e.g., flat disc-shaped members).

In some embodiments, ultrasonic flow sensor assembly 800 includes a structural member, a housing member, a rigid member, an enclosure, etc., shown as structural member 805. Structural member 805 may enclose or provide structural support for ultrasonic transducers 804 and 810. In some embodiments, ultrasonic transducers 804 and 810 are fixedly coupled with structural member 805 such that structural member 805, and ultrasonic transducers 804 and 810 form an assembly. In some embodiments, the assembly may be removably fixedly coupled with the conduit 814 (e.g., fastened, riveted, adhered, etc.). In some embodiments, structural member 805 is a rigid member along which ultrasonic transducers 804 and 810 are fixedly coupled so that a distance between ultrasonic transducers 804 and 810 is fixed.

Ultrasonic transducers 804 and 810 are located a fixed distance 826, L, from each other. This distance 826 can be directly proportional to the diameter 828 of the conduit 814. In some embodiments, distance 826 is substantially equal to twice the diameter 828 of the conduit 814. Ultrasonic transducers 804 and 810 may contain an electronic circuit that is configured to alternately send an ultrasonic signal (e.g. ultrasonic sound wave) which travels along an ultrasonic wave path 806 in the direction 822 or 824. In some embodiments, ultrasonic transducer 804 is upstream relative to ultrasonic transducer 810. Acoustic reflectors 808 and 818 reflect the ultrasonic signals along ultrasonic wave path 806. For example, ultrasonic transducer 810 sends an ultrasonic signal to ultrasonic transducer 804 upstream that travels along ultrasonic wave path 806 in direction 822. Ultrasonic transducer 804 detects the ultrasonic signal generated by ultrasonic transducer 810 (downstream). In some embodiments, ultrasonic transducers 804 and 810 are configured to convert ultrasonic waves to voltage or current, or vice versa. Then, the electronic circuit measures the elapsed time from the instant the ultrasonic signal is generated from ultrasonic transducer 810 to the instant ultrasonic transducer 804 receives the ultrasonic signal. This is called transit or travel time also referred to as $t_{transit}$ which may be $t_{transit,up}$ (e.g., transit time upstream) or $t_{transit,down}$ (e.g., transit time downstream). The electronic circuit then reverses the operation and sends another ultrasonic signal this time to ultrasonic transducer 810 in direction 824 and measures the transit time $t_{transit}$ from ultrasonic transducer 804. Since the acoustic signals travel at the speed of sound in the medium, the time to travel in a direction of a flow 820 is less than the time to travel in the opposite direction of flow 820. The difference in travel time is proportional to a fluid speed (e.g. measured in meters per second (m/s)). Knowing the diameter 828 of pipe 814, a volumetric flow rate (e.g. measured in meters cubed per second (m$^3$/s)) of the fluid can be calculated. In some embodiments, the electronic operates ultrasonic transducers 804 and 810 to perform the operations described herein to detect or obtain the volumetric flow rate of the fluid through pipe 814.

In some embodiments, transducers 804 and 810 may not require acoustic reflectors 808 and 818. Discarding acoustic reflectors 808 and 818 in an HVAC system may provide advantages, most notably to provide more effective flow rate readings when a large diameter 828 pipe 814 is used. However, in some embodiments, transducers 804 and 810 require acoustic reflectors 808 and 818, most notably to provide more effective flow rate readings when a small diameter 828 pipe 814 is used. Various configurations of reduced length ultrasonic flow sensor assemblies are described in further detail below with reference to FIGS. 11 and 12.

Figure 9:
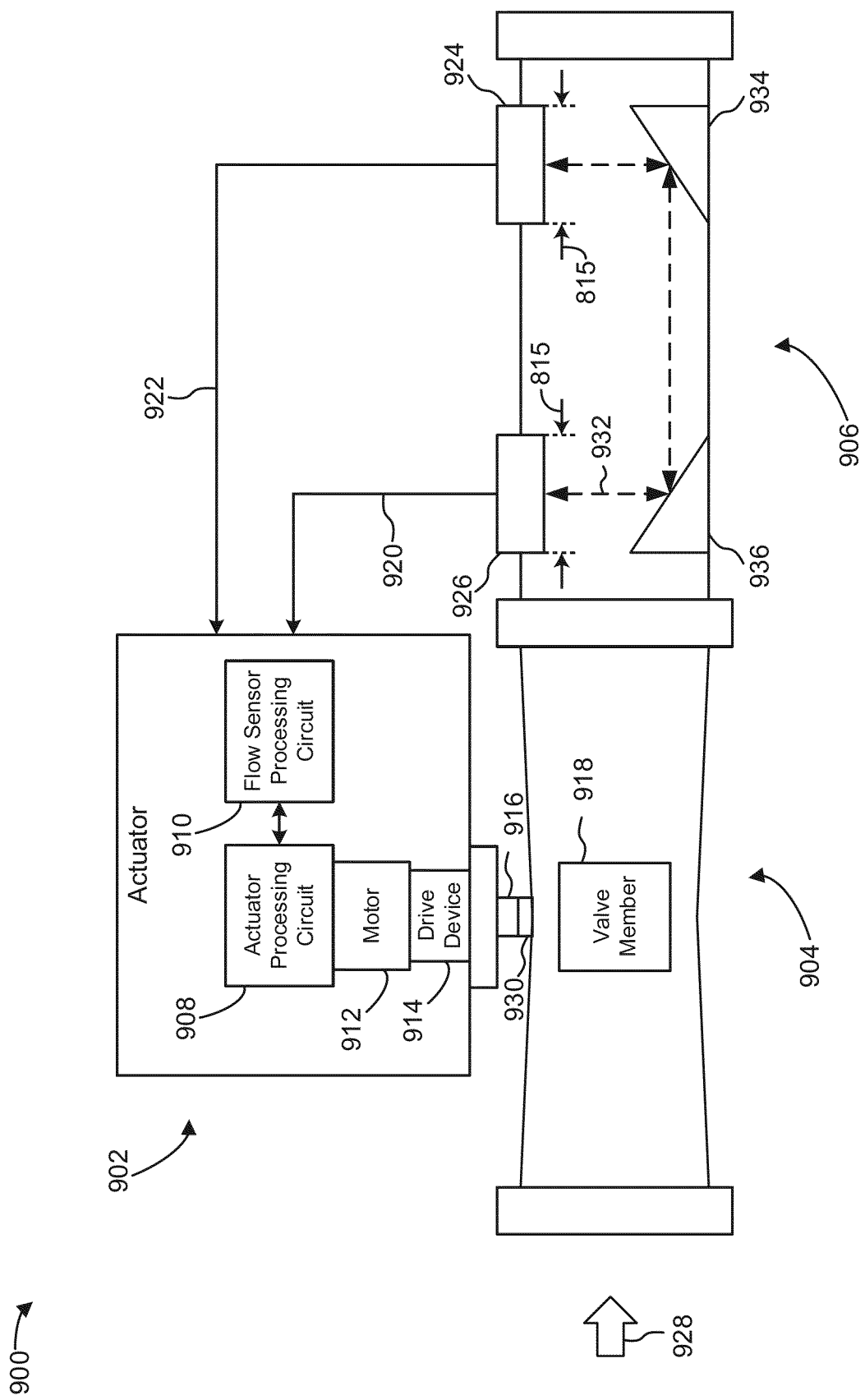
FIG. 9 is a schematic diagram of a downstream arrangement of a valve-coupled ultrasonic electronic pressure-independent control assembly that can be implemented in the HVAC system of FIG. 1, according to some embodiments.

Referring now to FIG. 9, a schematic diagram of a downstream arrangement of a valve-coupled ultrasonic electronic pressure-independent control assembly 900 is shown, according to some embodiments. Valve-coupled control assembly 900 is shown to include an actuator 902 coupled to a valve 904. Actuator 902 may include a motor 912 coupled to a drive device 914. In some embodiments, actuator 902, actuator 702, and/or actuator 602 are the same as or similar to each other. For example actuator 902 can include any of the features, functionality, configuration, etc., of actuator 702 and/or actuator 602, and vice versa. Drive device 914 is driven by motor 912 and configured to rotate a valve shaft 916 attached to a valve stem 930. Valve stem 930 consequently drives a valve member 918 to a position (i.e., actuator setpoint) resulting in regulation of a flow 928 of a fluid. Actuator 902 is also shown to include an actuator processing circuit 908 communicably coupled to motor 912 and a flow sensor processing circuit 910. Actuator processing circuit 908 can be communicably coupled to the flow sensor processing circuit 910 and the various components thereof can send and receive data (e.g. flow rate data, flow data, flow measurement data) via a wired or wireless network interface. In some embodiments, the actuator processing circuit 908 and flow sensing processing circuit 910 may both use communication mechanisms of a variety of disparate communications protocols (e.g., BACnet, LON, WiFi, Bluetooth, NFC, TCP/IP, etc.).

In some embodiments, the flow sensing processing circuit 910 can provide filtered measurements (e.g. flow rate) to the actuator processing circuit 908 using statistical filtering techniques (e.g. low pass filtering, Kalman filtering, etc.). Various statistical filtering techniques can be utilized to minimize variance in data measurements, as described above with reference to FIG. 6. Calculated data (e.g., filtered flow measurements) in addition to received data (e.g., flow rate setpoints) can be used to determine actuator setpoints, as described with reference to FIG. 6.

For example, flow sensing processing circuit 910 may be configured to receive sensor data from ultrasonic transducers 924 and 926 and output filtered measurements (e.g., of the flow rate) to the actuator processing circuit 908 using a Kalman filter. In some embodiments, flow sensing processing circuit 910 is configured to use any of the filtering techniques described in greater detail with reference to U.S. application Ser. No. 13/756,229, filed Jan. 31, 2013, now U.S. Pat. No. 9,568,204, the entire disclosure of which is incorporated by reference herein. For example, flow sensing processing circuit 910 can include a Kalman filter having a matrix Q (e.g., a process noise covariance matrix) that can be adaptively reset or adjusted. In some embodiments, flow sensing processing circuit 910 is configured to perform process 500 shown in FIG. 5 of U.S. Pat. No. 9,568,204 using sensor data or flow measurements received from any of the ultrasonic transducers described herein to filter the sensor data or the flow measurements.

Still referring to FIG. 9, valve-coupled control assembly 900 is further shown to include flow sensor assembly 906 directly coupled to valve 904 without requiring a length of conduit situated between the flow sensor 906 and the valve 904. Eliminating the requirement of conduit (e.g. straight pipe) between flow sensor 906 and valve 904 may provide numerous advantages, most notably in reducing the overall size and number of parts in valve assembly 900.

The operation of flow sensor assembly 906 can be identical or substantially similar to the ultrasonic flow sensor 800, as described in reference to FIG. 8. For example, flow sensor 906 may include one or more, among other components, acoustic reflectors (mirrors), ultrasonic transducers, communication lines, and pipes. In some embodiments, communication lines (e.g. network interface) 920 and 922 connecting ultrasonic transducers 924 and 926 that use acoustic reflectors 934 and 936 to flow sensor processing circuit 910 can be wireless. In other embodiments, communication lines 920 and 922 connecting ultrasonic transducers 924 and 926 to flow sensor processing circuit 910 can be wired. Various configurations of flow sensor assembly 906 are described in further detail below with reference to FIG. 11 and FIG. 12.

Figure 10:
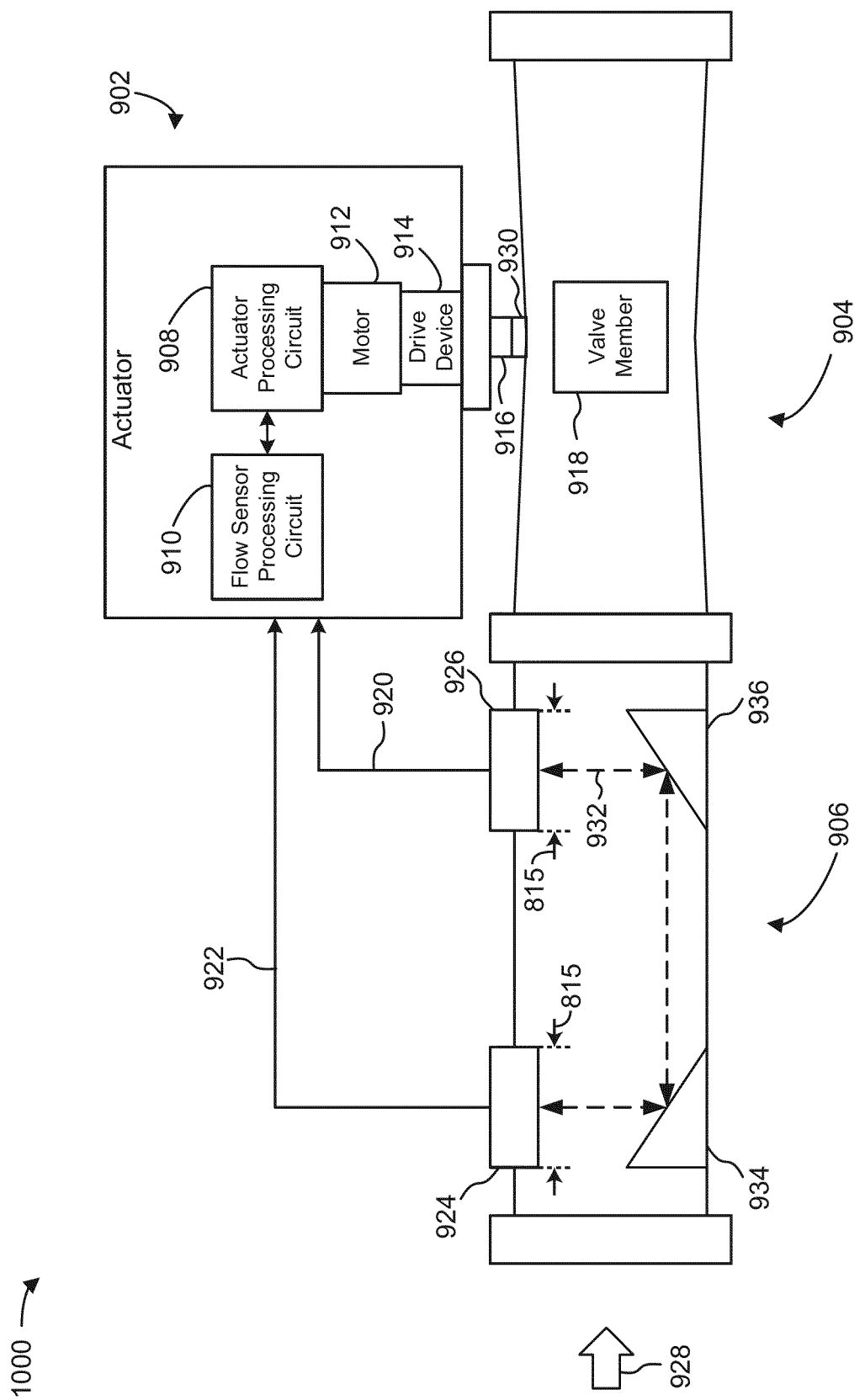
FIG. 10 is a schematic diagram of an upstream arrangement of a valve-coupled ultrasonic electronic pressure-independent control assembly that can be implemented in the HVAC system of FIG. 1, according to some embodiments.

Turning now to FIG. 10, a schematic diagram of an upstream arrangement of a valve-coupled ultrasonic electronic pressure-independent control assembly 1000 is shown, according to some embodiments. The valve-coupled control assembly 1000 can be substantially similar to the valve-coupled control assembly 900, as described in reference to FIG. 9, and may include any of the components, functionality, configuration, etc., of the valve-coupled control assembly 900. For example, valve-coupled control assembly 1000 may include, among other components, actuator 902, valve 904, and flow sensor assembly 906. Valve-coupled control assembly 1000 may include at modification in reference to the location of flow sensor assembly 906. Flow sensor assembly 906 can be located upstream in reference to valve 904, while valve-coupled control assembly 900 may have flow sensor assembly 906 located downstream in reference to valve 904. In some embodiments, locating flow sensor assembly 906 upstream (as shown in FIG. 10) results in more reliable flow measurements due to a lack of flow turbulence. In some embodiments, placing the flow sensor assembly 906 downstream of valve 904 results in a known disturbance upstream of the flow sensor assembly 906 and facilitates reducing or removing the risk of unknown flow dynamics. In some embodiments, positioning the flow sensor assembly 906 downstream of valve 904 facilitates reducing an overall installation length since no extra pipe diameters upstream of sensor assembly 906 are required. However, due to the turbulence generated by the valve 904, it may be desirable to place sensor assembly 906 upstream od valve 904.

Figure 11:
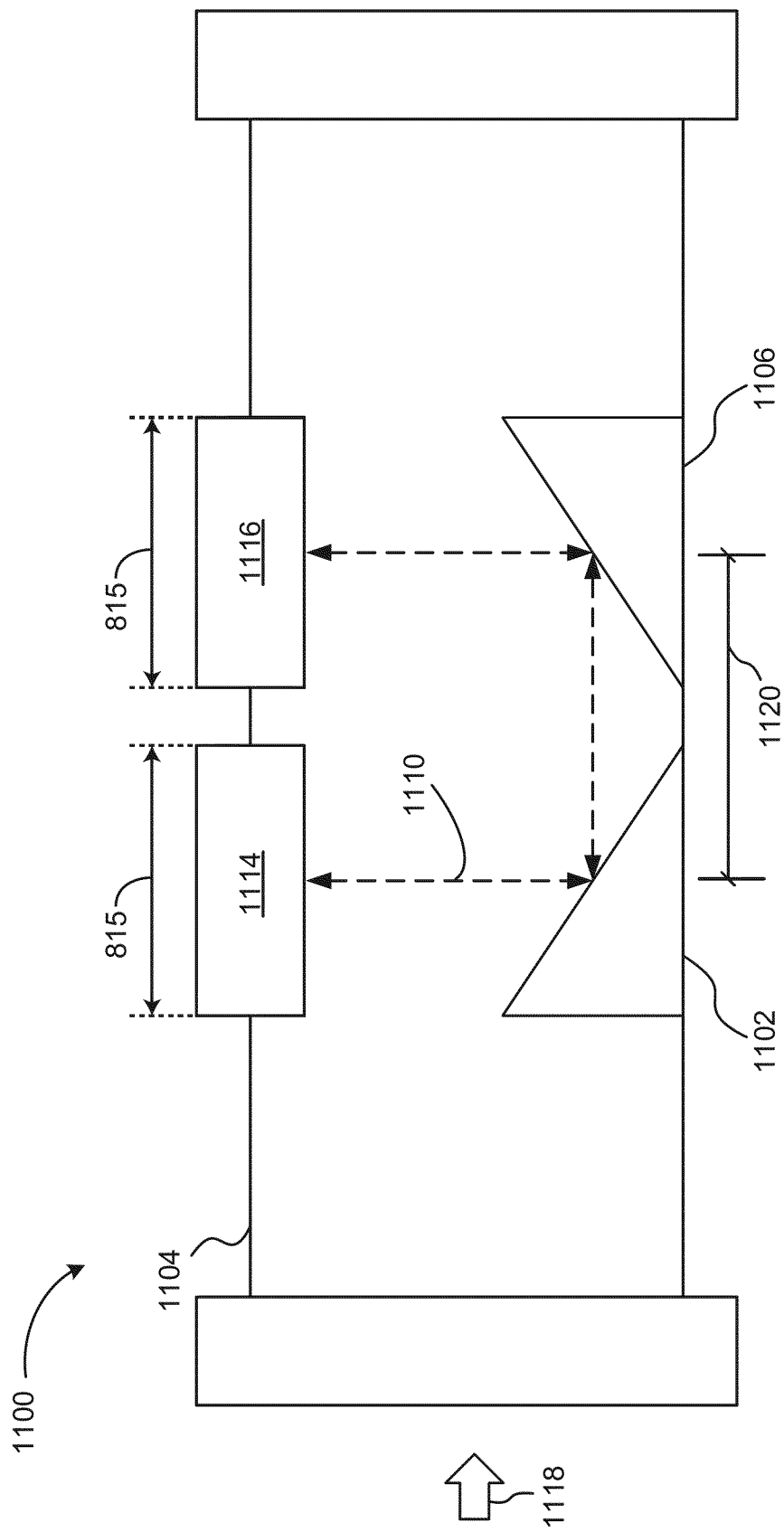
FIG. 11 is a schematic diagram of a mirrored configuration of an ultrasonic standalone flow sensor that can be implemented in the HVAC system of FIG. 1, according to some embodiments.

Referring now to FIG. 11, a schematic diagram of a mirrored configuration of a standalone ultrasonic flow sensor assembly 1100 is shown. In some embodiments, ultrasonic flow sensor assembly 1100 is shown to include ultrasonic transducers 1114 and 1116. Ultrasonic transducers 1114 and 1116 can be identical or substantially similar to ultrasonic transducers 804 and 812, as described with reference to FIG. 8. Ultrasonic flow sensor assembly 1100 is further shown to include a fixed pipe 1104, an ultrasonic wave path 1110, and a flow 1118. In some embodiments, ultrasonic wave path 1110 and fluid flow 1118 is identical or substantially similar to ultrasonic wave path 806 and flow 820, as described with reference to FIG. 8.

Figure 12:
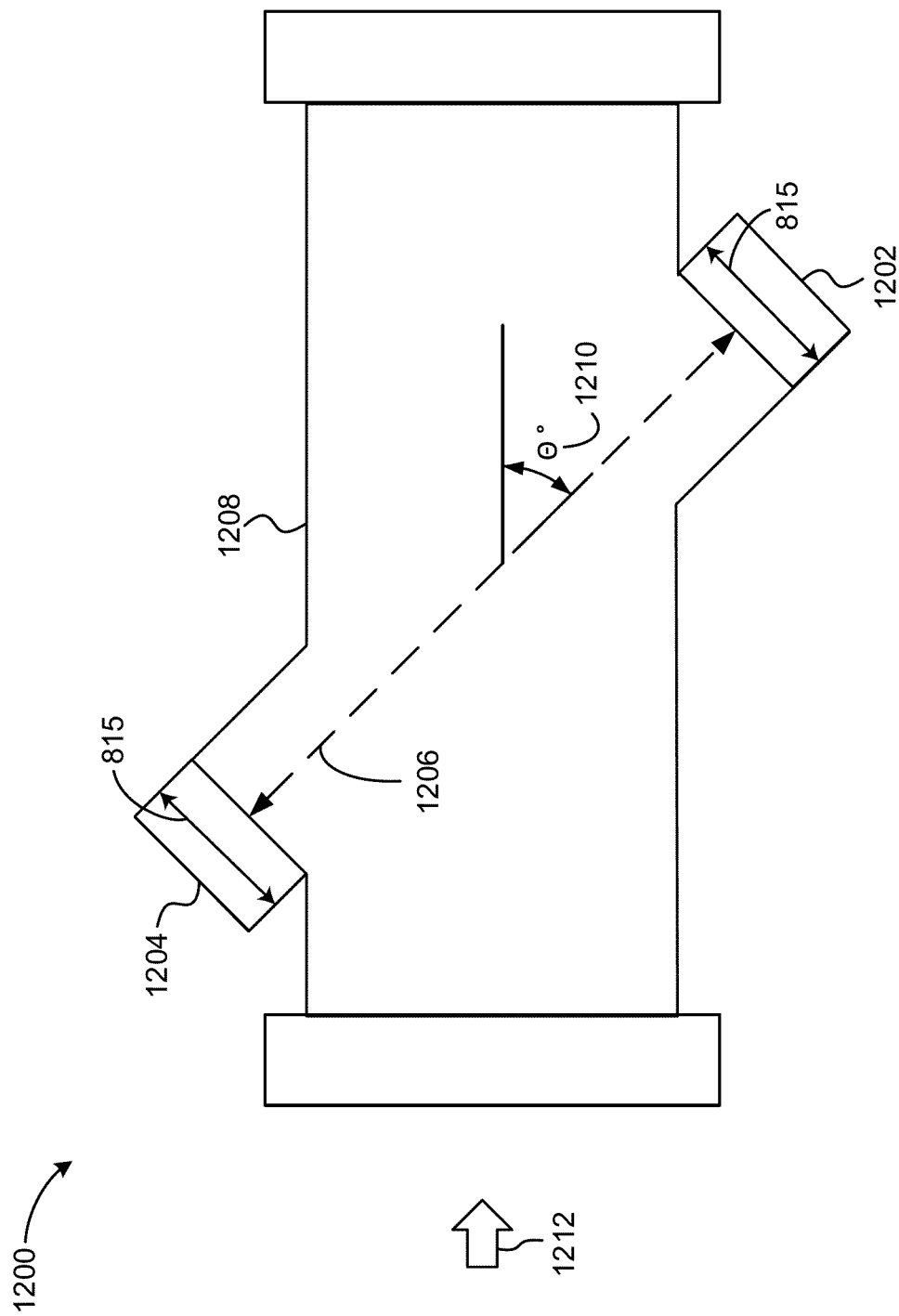
FIG. 12 is a schematic diagram of a mirrorless configuration of an ultrasonic standalone flow sensor that can be implemented in the HVAC system of FIG. 1, according to some embodiments.

Ultrasonic flow sensor assembly 1100 also includes acoustic reflectors (i.e., mirrors) 1102 and 1106. Simply, acoustic reflectors 1102 and 1106 reflect the ultrasonic signals along ultrasonic wave path 1110. Acoustic reflectors 1102 and 1106 are also shown to be fixed regardless of or independent of pipe diameter (e.g. diameter 828) such that a distance 1120, between acoustic reflector 1102 and 1106 is constant. In some embodiments, a minimum distance between acoustic reflectors 1102 and 1106 (e.g., a minimum value of distance 1120) is 1 diameter of the sensor assembly (e.g., the ultrasonic transducers 1114 and 1116 are mounted directly next to each other). In some embodiments, a housing of the ultrasonic transducers 1114 and 1116 results in a mechanical restriction. In some embodiments, distance 1120 is a function of the sensor diameter 815 and/or a diameter of the conduit (e.g., diameter 828). For example, distance 1120 may be substantially equal to 1.25×D where D is a diameter 815 of any of the ultrasonic transducers (e.g., ultrasonic transducers 804, 810, as shown in FIG. 8, transducers 924 or 926 as shown in FIGS. 9 and 10, transducers 1114 and 1116 as shown in FIG. 11, or ultrasonic transducers 1202 and 1204 as shown in FIG. 12). Fixed distance 1120 between acoustic reflectors 1102 and 1106 allows ultrasonic flow sensor 1100 to satisfy applications with an overall shorter sensor body.

Referring back to FIG. 8, the distance 826 between ultrasonic transducers 804 and 810 is necessary to control a signal-to-noise-ratio ("S/N"), and will fluctuate depending on diameter 828 of the flow sensor assembly 800. The overall shorter sensor assembly of FIG. 11 can be accomplished by using statistical filtering techniques, as described in reference to FIG. 6. In some embodiments, the use of statistical filtering techniques can reduce the distance between transducers 1114 and 1116 up to 50% when compared to a flow sensor assembly that does not utilize statistical filtering techniques. Specifically, utilizing statistical filtering techniques may facilitate reducing the length of a "normal length" flow sensor (e.g., a flow sensor that does not use statistical filtering techniques) or current manufacturing practice.

Turning now to FIG. 12, a schematic diagram of a mirrorless configuration of a standalone ultrasonic flow sensor assembly 1200 is shown, according to some embodiments. Ultrasonic flow sensor assembly 1200 is shown to include ultrasonic transducers 1202 and 1204 fixed to a pipe 1208. In some embodiments, ultrasonic transducers 1202 and 1204 can be positioned opposed of each other (i.e., a flow of fluid 1212 passes between the transducers 1202 and 1204). Ultrasonic transducers 1202 and 1204 each contain an electronic circuit that is configured to alternately send an ultrasonic signal (e.g. ultrasonic sound wave) which travels along an ultrasonic wave path 1206 at an angle 1210 respect to the flow 1212. In some embodiments, angle 1210 has a value of 45 degrees. In some embodiments, angle 1210 is any value between 30 and 60 degrees. For example, ultrasonic transducer 1202 sends an ultrasonic signal to ultrasonic transducer 1204 upstream that travels along ultrasonic wave path 1206 at the angle 1210, rather than ultrasonic wave path 806 that travels in a perpendicular and parallel path with respect to flow 820, as described with reference to FIG. 8. Ultrasonic transducer 1204 detects the ultrasonic signal generated by ultrasonic transducer 1202 (downstream). An electronic circuit (e.g., flow sensor processing circuit 910) measures the elapsed time from the instant the ultrasonic signal is generated from ultrasonic transducer 1202 to the instant ultrasonic transducer 1204 receives the ultrasonic signal. The electronic circuit then reverses the operation and sends another ultrasonic signal this time to ultrasonic transducer 1204 at the angle 1210 and measures a transit time from ultrasonic transducer 1204. In some embodiments, the mirrorless configuration of the standalone ultrasonic flow sensor assembly 1200 is used for pipes with larger diameters (e.g., with inner diameters that are 4 inches or greater).

Figure 13:
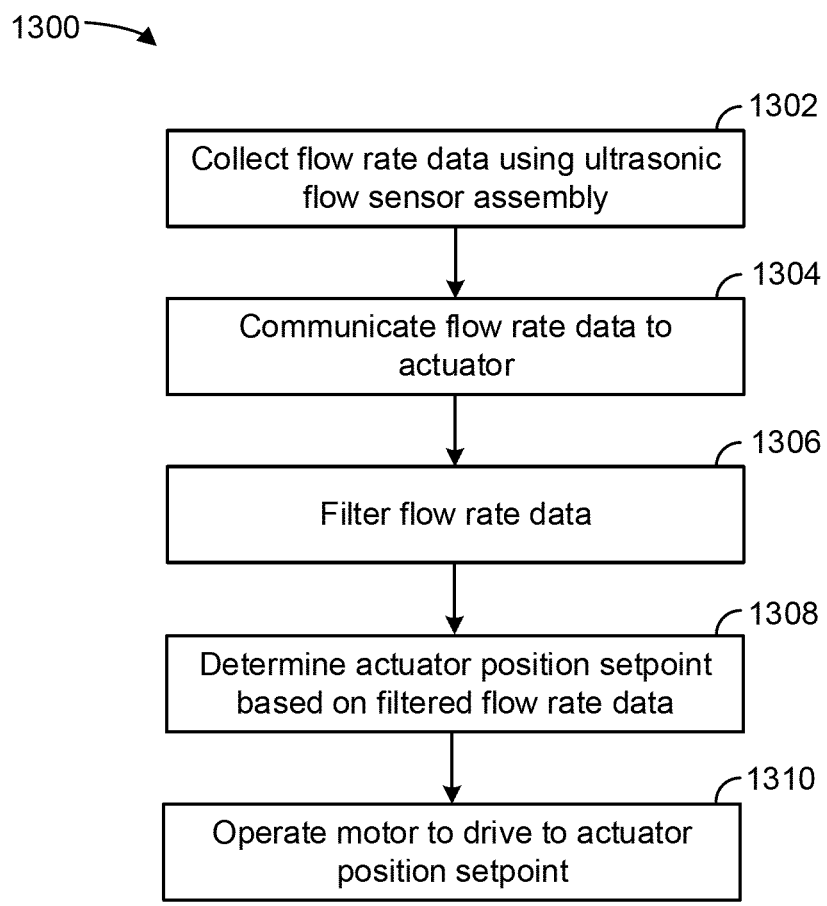
FIG. 13 is a flow diagram of a process for operating a valve-coupled ultrasonic electronic pressure-independent control assembly, according to some embodiments.

Turning now to FIG. 13, a flow diagram of a process 1300 for operating a valve-coupled ultrasonic electronic pressure-independent control assembly, according to an exemplary embodiment. In some embodiments, process 1300 may be performed by control assembly 900 or control assembly 1000, described above with reference to FIGS. 9-10. In other embodiments, process 1300 may be performed by the flow signal filtering circuit 636 of actuator 602, described above with reference to FIG. 6. For the purposes of simplicity, process 1300 will be described exclusively with reference to control assembly 900. Process 1300 is shown to commence with step 1302, in which one or more ultrasonic transducers (e.g. transducers 924 and 926) collect flow rate data. More particularly, the ultrasonic transducers 924 and 926 collect the flow rate data by sending one or more ultrasonic signals along an ultrasonic wave path 932.

At step 1304, the flow sensor assembly 906 communicates the flow rate data to an actuator 902 (and more particularly to the flow sensor processing circuit 910). In some embodiments, the unfiltered flow rate data may be designated as "raw" flow rate data. In some embodiments, the flow sensor processing circuit 910 receives the flow rate data through a wireless connection from the flow sensor assembly 906. In other embodiments, flow sensor processing circuit 910 receives the flow rate data through a wired connection from the flow sensor assembly 906.

Process 1300 continues with step 1306, in which the flow sensor processing circuit 910 performs statistical filtering techniques (e.g. low pass filtering, Kalman filtering) on the flow rate data. In some embodiments, one or more high variance signals in one or more flow measurements can be observed. High variance signals can be addressed by performing statistical filtering techniques on the flow measurements. For example, even when there are high-variance signals, performing statistical filtering techniques may result in accurate and consistent flow measurements. Further details of statistical filtering techniques are included above and with reference to FIG. 6.

At step 1308, after performing statistical filtering techniques the actuator processing circuit 908 may determine an actuator position setpoint. In some embodiments, the actuator position setpoint can be determined in a process identical or substantially similar to the process performed by actuator processing circuit 908 as described with reference to FIG. 9. For example, in an exemplary embodiment, the actuator processing circuit 908 determines the actuator setpoint using a PVDC control technique. In other embodiments, a different type of feedback control may be utilized.

Process 1300 continues with step 1310, in which the actuator setpoint is used by actuator 902 to engage motor 912. In some embodiments, the drive device 914 can be configured to be driven by the motor 912 and coupled to the valve 904 for driving valve stem 930 within a range of positions. For example, actuator 902 receives a new setpoint in which a chain of sequences follows. The new setpoint is communicated to motor 912 that operates drive device 914 so that it can rotate valve shaft 916 which is attached to valve stem 930. The valve stem 930 operates the valve member 918 within a range of positions, subsequently regulating the flow 928 of the fluid through the valve body 904. In some embodiments, valve member 918 may regulate the flow of the fluid through a conduit, pipe, duct, or tube.

Figure 14:
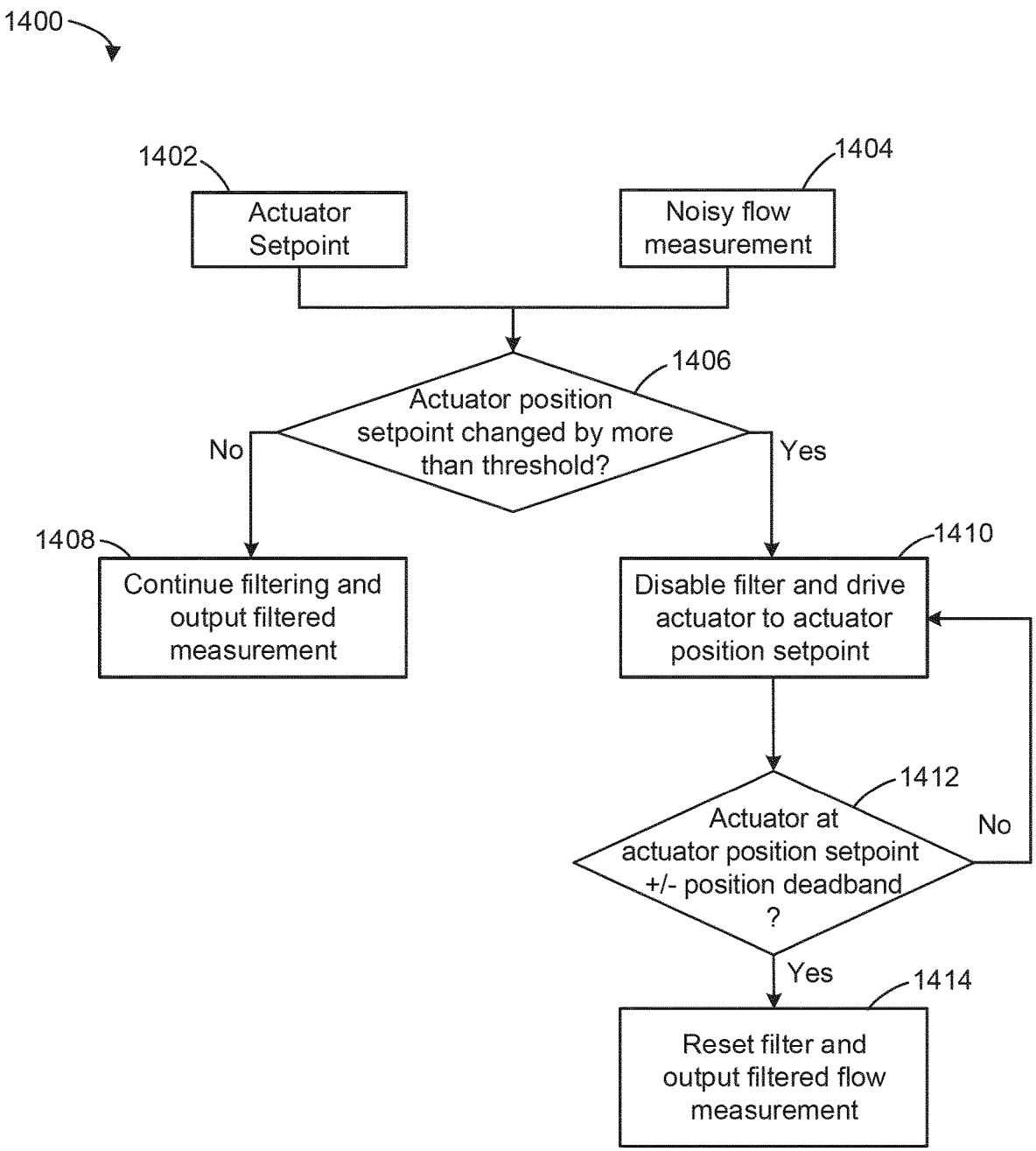
FIG. 14 is a flow diagram of a process for filtering a flow measurement, according to some embodiments.

Turning now to FIG. 14, a flow diagram of a process 1400 for filtering flow measurements is shown, according to an exemplary embodiment. In some embodiments, process 1400 may be performed by control assembly 900 or control assembly 1000, described above with reference to FIGS. 9-10. For example, process 1400 may be performed in part by the actuator processing circuit 908 and/or the flow sensor processing circuit 910. In other embodiments, process 1400 may be performed by the flow signal filtering circuit 636 of actuator 602, described above with reference to FIG. 6. For the purposes of simplicity, process 1400 will be described exclusively with reference to control assembly 900. Process 1400 is shown to commence with steps 1402 and 1404, in which an actuator setpoint and a noisy flow measurement are received at the flow sensor processing circuit 910. In some embodiments, actuator setpoint is received from the actuator processing circuit 908. In some embodiments, the noisy flow measurement (which may also be designated a "raw" flow measurement) is received from sensor assembly 906 using ultrasonic transducers 924 and 926 and communicated to the flow sensor processing circuit 910 through a wired or wireless connection. In some embodiments, a "noisy" flow measurement is defined as a flow measurement with a variance that exceeds a variance threshold value, or a signal to noise ratio that exceeds a predetermined signal to noise ratio threshold value.

At step 1406, the actuator processing circuit 908 determines if the received actuator setpoint has changed by a threshold amount or more since the last time the actuator setpoint was recorded (e.g., at a last time step). In response to the actuator processing circuit 908 determining the actuator setpoint has not changed (or has changed an amount less than the threshold), the process continues with step 1408 where the flow sensor processing circuit 910 continues to filter the noisy flow measurement and generate a filtered flow rate measurement that is then utilized by the feedback controller of the actuator processing circuit 908 to generate a new actuator position setpoint. In some embodiments, the threshold amount is an adjustable value or parameter.

However, returning to step 1406, if the flow sensor processing circuit 910 determines the actuator setpoint received in step 1402 has changed at least the threshold amount since the last time step, process 1400 continues with step 1410. At step 1410, the flow sensor processing circuit 910 disables a flow measurement filter (e.g. a low pass filter), holds an existing flow measurement value, and/or drives the actuator to the actuator position setpoint. Use of the existing flow measurement value when the actuator setpoint has changed prevents the feedback controller of the actuator processing circuit 908 from controlling the valve member 918 according to flow measurements that may be unstable due to the change in the position of the valve member 918.

Process 1400 continues with step 1412, in which the actuator processing circuit 908 determines if an actuator position measurement is within a specified tolerance of the new actuator setpoint. For example the actuator processing circuit 908 may determine if the actuator is at the actuator position setpoint+/−a position deadband. In some embodiments, the deadband is or is determined based on a dynamically adjustable parameter. The deadband may be a dynamic deadband and actuator processing circuit 908 may use proportional variable deadband control (PVDC) as described in greater detail with reference to U.S. patent application Ser. No. 15/908,041, filed Feb. 28, 2018, the entire disclosure of which is incorporated by reference herein. In response to the actuator processing circuit 908 determining the actuator position measurement is not within the specified tolerance, process 1400 reverts to step 1410. Conversely, in response to the actuator processing circuit 908 determining the actuator position measurement is within the specified tolerance, process 1400 concludes with step 1414, in which the flow sensor processing circuit 910 resets the filter and generates a filtered flow measurement. The filtered flow measurement may be utilized by the feedback controller of the actuator processing circuit 908 to generate a new actuator position setpoint. In some embodiments, the flow sensor processing circuit 910 resets the filter in response to valve member 918 reaching its position setpoint.

The flow sensor processing circuit 910 may reset the filter (e.g., reset a Kalman filter) by resetting, adjusting, adaptively adjusting, changing, etc., a matrix that indicates a process noise covariance. In some embodiments, one or more parameters of the filter are updated, adjusted, reset, changed, etc., once the valve member 918 reaches its position setpoint such that a memory of past measurements that are stored in or used by the filter are cleared. In this way, resetting the filter ensures that previous measurements of the flow do not affect a current flow measurement or a current operation of the valve member 918. In some embodiments, resetting the filter clears turbulent events (e.g., noisy measurements) that may be otherwise stored in the memory of the filter. Resetting the filter may remove previously recorded noisy measurements from consideration, thereby improving or increasing a likelihood of convergence of the filter to an actual value of the flow rate measurement. In some embodiments, the flow sensor processing circuit 910 is configured to reset the filter in response to detecting that the valve member 918 has reached its position setpoint (e.g., reached a desired position).

Figure 15:
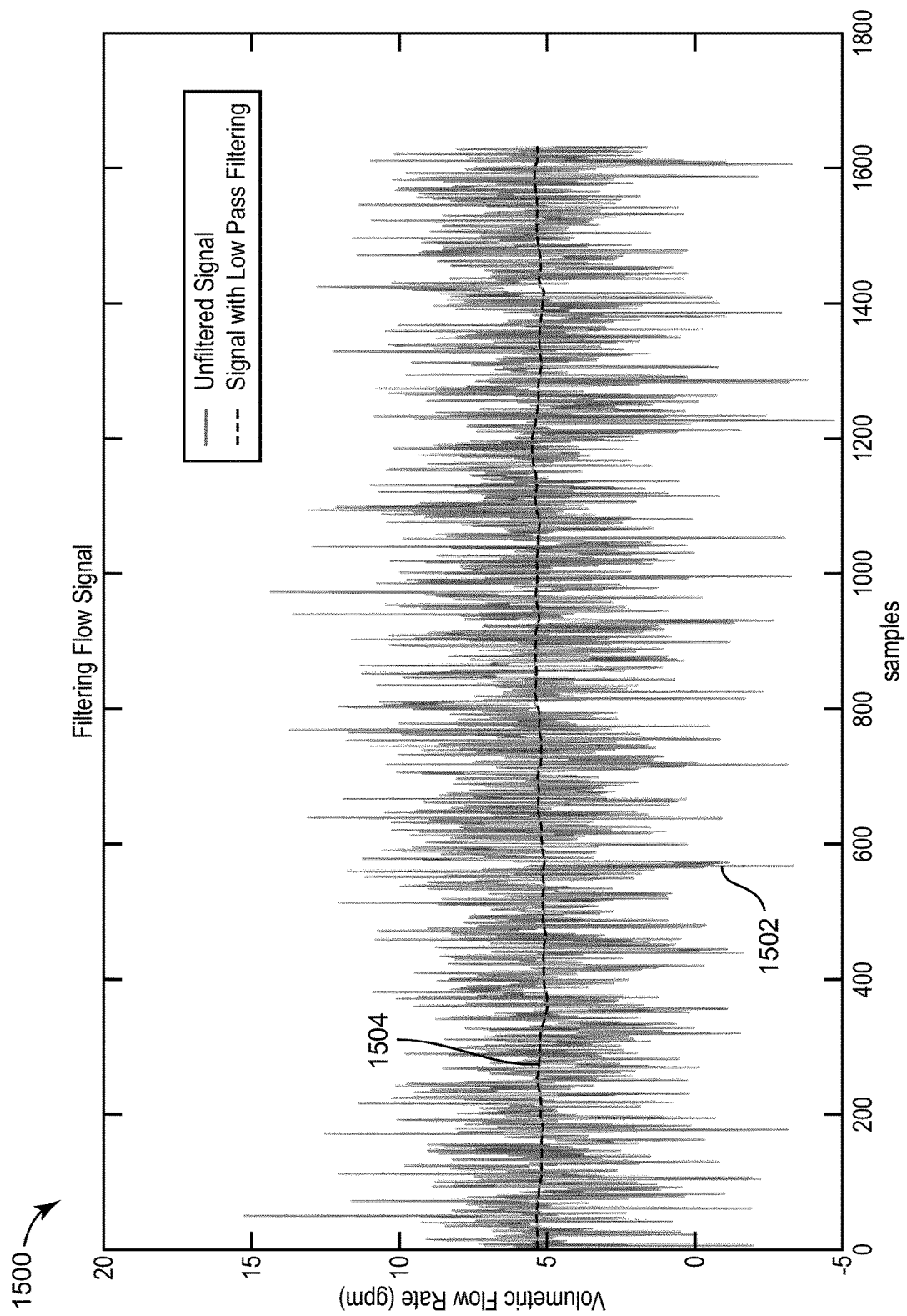
FIG. 15 is a graph of volumetric flow rate versus samples for any of the ultrasonic flow sensor assemblies of FIGS. 8-12 showing an effect of filtering a signal associated with the volumetric flow rate, according to some embodiments.

Referring now to FIG. 15, a graph 1500 shows signals associated with volumetric flow rate (e.g., values of the Y-axis in gallons per minute "gpm") through a conduit (e.g., pipe 814, fixed pipe 1104, pipe 1208, etc.) with respect to samples (e.g., values of the X-axis) or time, according to some embodiments. Graph 1500 includes series 1502 and series 1504, according to some embodiments. Series 1502 illustrates a sensor signal (e.g., voltage values, volumetric flow rate values determined based on a sensor voltage, etc.) over time. In some embodiments, series 1502 represents sensor signals that are unfiltered or directly received from a sensor. For example, series 1502 may represent sensor signals received from any of the sensors of ultrasonic flow sensor assembly 800, valve-coupled control assembly 900, valve-coupled control assembly 1000, ultrasonic flow sensor assembly 1100, or ultrasonic flow sensor assembly 1200. In some embodiments, series 1502 represents sensor signals received or sampled directly from any of ultrasonic transducers 804 and/or 810, transducers 924 and/or 926, transducers 1114 and/or 1116, or ultrasonic transducers 1202 and/or 1204.

As shown in FIG. 15 and represented by series 1502, the signal received directly from the sensor (e.g., a transducer, an ultrasonic transducer, etc.) may be noisy including peaks and valleys. Series 1504 illustrates series 1502 (e.g., an unfiltered, raw, or otherwise unprocessed, sensor signal received directly from a sensor) after the signal has been passed through a low-pass filter. Passing the signal represented by series 1502 through a low-pass filter may attenuate noise that is present in the signal, as shown in FIG. 15. In some embodiments, series 1504 represents the signal received from one or more sensors (e.g., as represented by series 1502) after the signal has been filtered (e.g., using any of the filtering or statistical filtering techniques described herein) by any of flow sensor processing circuit 910, etc. Series 1504 can represent a signal that is provided to and used by actuator processing circuit 908 or any other processing circuit, computer, controller, device, etc., that processes, uses, analyzes, etc., the signal represented by series 1504 or uses the signal represented by series 1504 to control, adjust an operation of, troubleshoot, etc., a mechanical transducer (e.g., motor 912).

Figure 16:
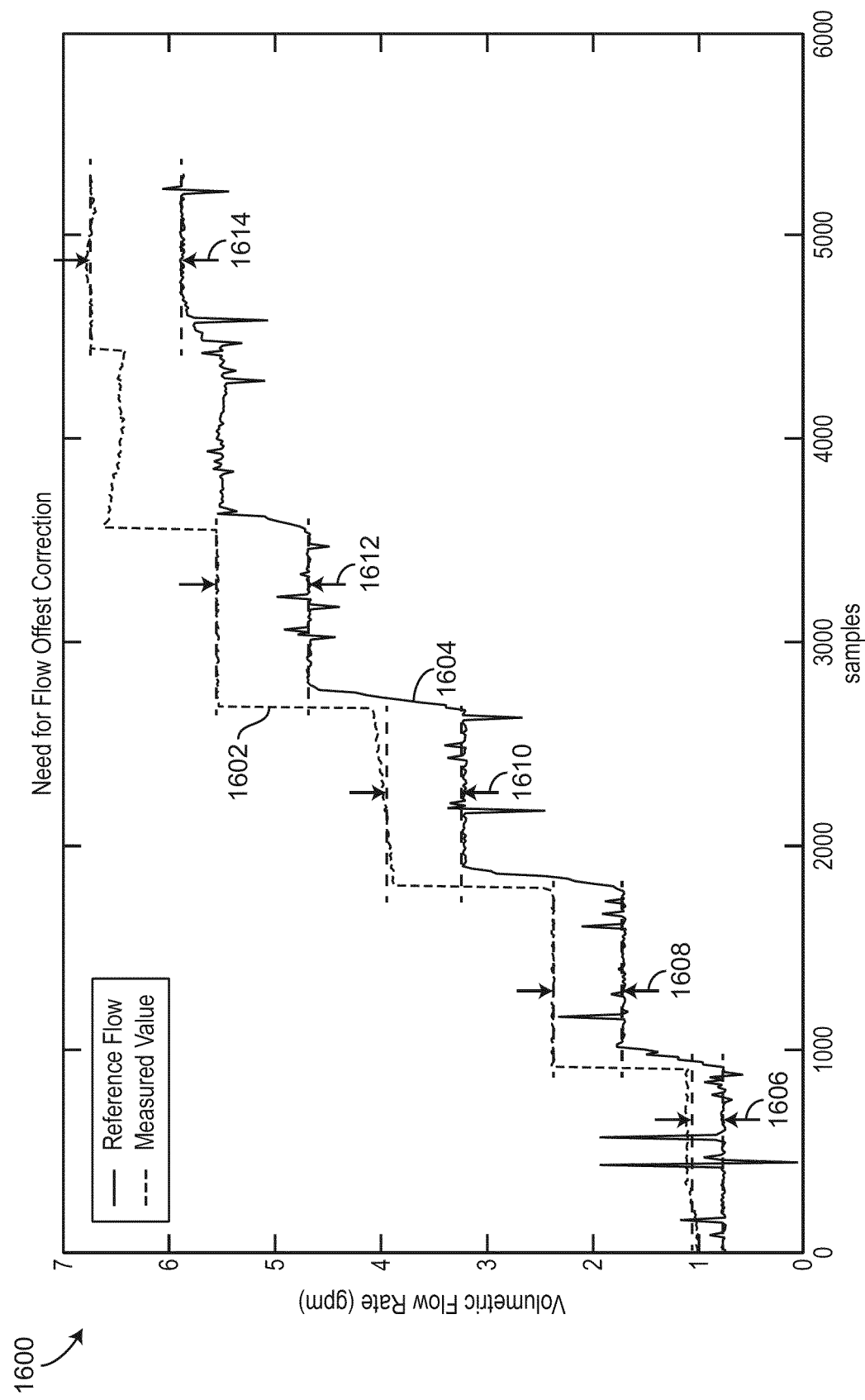
FIG. 16 is a graph of volumetric flow rate versus samples for any of the ultrasonic flow sensor assemblies of FIGS. 8-12 showing an effect of flow offset correction, according to some embodiments.

Referring now to FIG. 16, a graph 1600 shows volumetric flow rate through a conduit (e.g., pipe 814, fixed pipe 1104, pipe 1208, etc.) with respect to samples (e.g., values of the X-axis) or time, according to some embodiments. In some embodiments, graph 1600 includes series 1602 and series 1604. Series 1602 shows a value of the volumetric flow rate that is measured using any of flow sensor assembly 800, valve-coupled control assembly 900, valve-coupled control assembly 1000, ultrasonic flow sensor assembly 1100, or ultrasonic flow sensor assembly 1200. Series 1604 shows reference values of the volumetric flow rate through the conduit.

As shown in graph 1600, the flow rate that is measured using any of flow sensor assembly 800, valve-coupled control assembly 900, valve-coupled control assembly 1000, ultrasonic flow sensor assembly 1100, and/or ultrasonic flow sensor assembly 1200 (represented by series 1602) is offset (e.g., higher) than the reference values of the volumetric flow rate through the conduit (represented by series 1604). For example, at a first volumetric flow rate, the measured flow rate (series 1602) is greater than the reference flow rate (series 1604) by an offset amount 1606. At a second volumetric flow rate, the measured flow rate (series 1602) is greater than the reference flow rate (series 1604) by an offset amount 1608, according to some embodiments. At a third volumetric flow rate, the measured flow rate (series 1602) is greater than the reference flow rate (series 1604) by an offset amount 1610. At a fourth volumetric flow rate, the measured flow rate (series 1602) is greater than the reference flow rate (series 1604) by an offset amount 1612. At a fifth volumetric flow rate, the measured flow rate (series 1602) is greater than the reference flow rate (series 1604) by an offset amount 1614, etc.

Referring to FIGS. 5-7, 8-12, and 16, the offset amount (e.g., offset amounts 1606-1614) increase with increased volumetric flow rate through the conduit. For example, at higher volumetric flow rates through the conduit, the measured flow rate (series 1602) may be offset further than the reference flow rate (series 1604). In some embodiments, any of the processing circuits, controllers, processors, etc., that are operatively and/or communicably coupled with flow sensor 506, ultrasonic flow sensor assembly 800, flow sensor assembly 906, ultrasonic flow sensor assembly 1100, and/or ultrasonic flow sensor assembly 1200 (or any of the sensor components thereof) are configured to adjust the measured flow rate to account for offsets 1606-1614. In some embodiments, flow sensor processor 516, flow signal filtering circuit 636, processing circuit 606, controller 704, and/or flow sensor processing circuit 910, (any of which are referred to as "the processing circuit" for ease of explanation) are configured to adaptively adjust the measured flow rate. In some embodiments, the processing circuit is configured to determine an offset amount $\dot{V}_{offset}$ and adjust (e.g., increase or decrease) the measured flow rate by the offset amount.

In some embodiments, the offset amount is linearly and/or non-linearly related to the measured flow rate. For example, the offset amount may be proportional to the measured flow rate (e.g., referred to as $\dot{V}_{measured}$) such that: $\dot{V}_{offset} \propto \dot{V}_{measured}$. In some embodiments, the processing circuit is configured to determine the offset amount using a predetermined relationship, function, equation, etc., and the measured flow rate. The processing circuit may then adjust the measured flow rate using the offset amount to account for offsets 1606-1614 for various flow rates. In some embodiments, the processing circuit is configured to adjust a gain of a filter (e.g., the Kalman filter) used by the processing circuit based on the measured flow rate. For example, the processing circuit may increase the gain of the filter with increased values of the measured flow rate.

Figure 17:
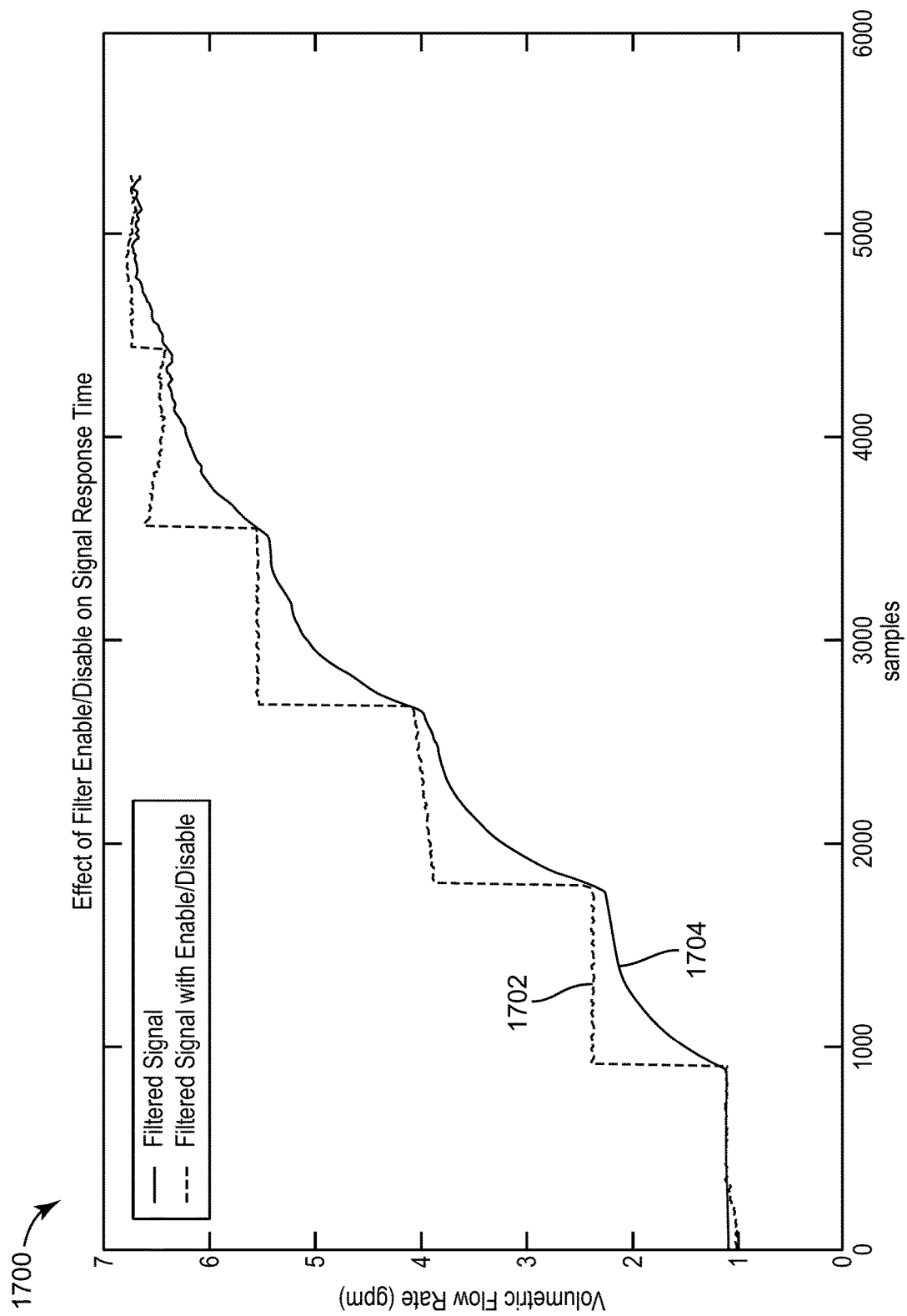
FIG. 17 is a graph of volumetric flow rate versus samples for any of the ultrasonic flow sensor assemblies of FIGS. 8-12 showing an effect of filter enable/disable on signal response time, according to some embodiments.

Referring now to FIGS. 5-7, 8-12, and 17, the processing circuit may be configured to enable/disable and/or activate/de-activate various signal processing (e.g., filtering techniques, adjustment techniques, adaptive filtering, etc.) when the flow rate through the conduit is changing to achieve a faster signal response time to disturbances. FIG. 17 shows a graph 1700 including series 1702 and series 1704. Graph 1700 illustrates values of the volumetric flow rate through the conduit (the Y-axis) with respect to samples (the X-axis), according to some embodiments. Series 1702 shows the filtered signal over time with enable/disable, while series 1704 shows the filtered signal over time without enable/disable. As shown in graph 1700, when the processing circuit enables/disables the filtering or signal processing techniques when the flow rate is changing, the signal response to disturbances in the system is increased. In some embodiments, the enable/disable feature is only used when the flow sensor (e.g., flow sensor 506, ultrasonic flow sensor assembly 900, flow sensor assembly 906, ultrasonic flow sensor assembly 1100, and/or ultrasonic flow sensor assembly 1200) is operatively or electrically coupled with a processing circuit that controls or adjusts an operation of a valve (e.g., valve 904, etc.).

In some embodiments, "enabling" the filter includes using output data from the filter for control, display, etc., of any of flow sensor 506, ultrasonic flow sensor assembly 900, flow sensor assembly 906, ultrasonic flow sensor assembly 1100, and/or ultrasonic flow sensor assembly 1200 (or any other flow sensor assemblies, actuators, valves, motors, etc., described herein). In some embodiments, "disabling" the filter includes using input data (e.g., raw sensor data) of the flow sensor (e.g., flow sensor 506, ultrasonic flow sensor assembly 900, flow sensor assembly 906, ultrasonic flow sensor assembly 1100, and/or ultrasonic flow sensor assembly 1200) for display, etc., of the flow sensor assembly and/or an actuator, motor, valve, etc., of the flow sensor assembly. In some embodiments, "disabling" the filter results in using position control only (e.g., moving the actuator to a new setpoint) without using flow control (e.g., without using the flow rate for control of the actuator). In this way, enabling or disabling the filter does not necessarily mean that the filter does not process data, but rather that the processing circuit uses the inputs or the outputs of the data for different applications or functions differently.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for determining a flow rate of a fluid through a valve, the system comprising:
a controller configured to:
receive a raw flow rate measurement from a flow rate sensor assembly configured to measure the flow rate;
apply a flow rate measurement filter to the raw flow rate measurement to generate a filtered flow rate measurement; and
automatically adjust the flow rate measurement filter in response to detecting a change in a position of the valve.

2. The system of claim 1, wherein the controller is further configured to:
control actuation of an actuator using the raw flow rate measurement for flow rate measured during actuation of the actuator to change the flow rate.

3. The system of claim 1, wherein the flow rate measurement filter comprises a memory of previously recorded values of the flow rate and the controller is configured to reset the flow rate measurement filter in response to detecting the change in the position of the valve.

4. The system of claim 1, wherein adjusting the flow rate measurement filter comprises clearing a memory of previously recorded values of the flow rate so that the previously recorded values of the flow rate are not used by the flow rate measurement filter to generate the filtered flow rate measurement.

5. The system of claim 1, wherein the filter is a digital filter.

6. The system of claim 5, wherein the filter is reset in response to the flow rate changing rapidly.

7. The system of claim 5, wherein an electronic sensor is located such that the fluid passes the electronic sensor.

8. The system of claim 7, wherein the electronic sensor is for disposition within a straight pipe and electronics for the controller are disposed above the electronic sensor outside of the pipe.

9. An electronic flow sensor assembly configured to measure a flow of fluid through a conduit, the electronic flow sensor assembly comprising:
a processing circuit configured to:
operate an actuator along a flow path of the fluid in the conduit by providing a voltage or current;
receive a voltage or current;
obtain a raw measurement of a flow rate of the fluid in the conduit using the received voltage or current; and
generate a filtered measurement of the flow rate of the fluid using a filter and the raw measurement, wherein the filter is adjusted in response to a change in a position of the actuator.

10. The electronic flow sensor assembly of claim 9, further comprising a structural member, separate from the conduit, wherein the structural member is fixedly coupled a sensor element.

11. The electronic flow sensor assembly of claim 9, further comprising a first ultrasonic transducer and a second ultrasonic transducer are oriented to emit and receive a ultrasonic signal in a direction perpendicular to the flow path of the fluid.

12. The electronic flow sensor assembly of claim 9, wherein the actuator is operatively coupled with the processing circuit, wherein the processing circuit is configured to operate the actuator to affect the flow rate of the fluid through the conduit using the filtered measurement of the flow rate of the fluid.

13. The electronic flow sensor assembly of claim 12, wherein the processing circuit is configured to use the filtered measurement of the flow rate of the fluid to operate the actuator when the actuator is within a position setpoint plus or minus a deadband and maintain a current value of the position setpoint when the actuator is outside of the deadband of the position setpoint.

14. The electronic flow sensor assembly of claim 9, wherein the processing circuit is configured to reset the filter in response to the flow rate changing rapidly, wherein resetting the filter comprises clearing a memory of the filter of previously obtained values of the raw measurement of the flow rate.

15. The electronic flow sensor assembly of claim 14, wherein clearing the memory comprises adjusting one or more parameters of the filter.

16. The electronic flow sensor assembly of claim 11, further comprising a first acoustic reflector and a second acoustic reflector, wherein the first and second acoustic reflectors are configured to cooperatively direct the ultrasonic signal emitted by the first ultrasonic transducer along the flow path of the fluid and to the second ultrasonic transducer.

17. The electronic flow sensor assembly of claim 16, wherein the first ultrasonic transducer and the second ultrasonic transducer are oriented to emit and receive the ultrasonic signal in the direction perpendicular to the flow path of the fluid.

18. The electronic flow sensor assembly of claim 9, wherein the filter is a digital filter.

19. A method for measuring a flow rate of fluid through a conduit, the method comprising:
   measuring the flow rate of the fluid and generating a raw flow rate measurement;
   applying a flow rate measurement filter to the raw flow rate measurement to generate a filtered flow rate measurement; and
   automatically adjusting the flow rate measurement filter in response to detecting a control action that affects the flow rate of the fluid.

20. The method of claim 19, further comprising:
   outputting the filtered flow rate measurement.

\* \* \* \* \*